United States Patent
Yazami et al.

(10) Patent No.: US 7,563,542 B2
(45) Date of Patent: Jul. 21, 2009

(54) SUBFLUORINATED GRAPHITE FLUORIDES AS ELECTRODE MATERIALS

(75) Inventors: Rachid Yazami, Los Angeles, CA (US); André Hamwi, Clermont-Ferrand (FR)

(73) Assignees: California Institute of Technology, Pasadena, CA (US); Centre National de la Recherche Scientifique, Paris Cedex 16 (FR)

( * ) Notice: Subject to any disclaimer, the term of this patent is extended or adjusted under 35 U.S.C. 154(b) by 362 days.

(21) Appl. No.: 11/422,564

(22) Filed: Jun. 6, 2006

(65) Prior Publication Data

US 2007/0077495 A1   Apr. 5, 2007

Related U.S. Application Data

(63) Continuation-in-part of application No. 11/253,360, filed on Oct. 18, 2005, now abandoned.

(60) Provisional application No. 60/724,084, filed on Oct. 5, 2005.

(51) Int. Cl.
H01M 4/58 (2006.01)
H01M 4/62 (2006.01)

(52) U.S. Cl. ............... 429/231.4; 429/217; 429/231.8; 429/231.95

(58) Field of Classification Search ............ 429/231.7, 429/232, 217, 231.4, 231.95
See application file for complete search history.

(56) References Cited

U.S. PATENT DOCUMENTS

| | | |
|---|---|---|
| 3,536,532 A | 10/1970 | Watanabe et al. |
| 3,700,502 A | 10/1972 | Wantanabe et al. |
| 3,796,604 A | 3/1974 | Gabano et al. |
| 3,796,605 A | 3/1974 | Dechenaux et al. |
| 3,956,018 A | 5/1976 | Kozawa |
| 4,052,539 A | 10/1977 | Shropshire et al. |
| 4,119,655 A | 10/1978 | Hulme |
| 4,247,608 A | 1/1981 | Watanabe et al. |
| 4,431,567 A | 2/1984 | Gestaut et al. |
| 4,438,086 A | 3/1984 | Aramaki et al. |

(Continued)

FOREIGN PATENT DOCUMENTS

EP   0 776 053   5/1997

(Continued)

OTHER PUBLICATIONS

Abidi et al. (2003) "Alkali Metal Ion Complexes of Functionalized Calizarene—Competition Between Pendent Arm and Anion Bond to Sodium," *Org. Biomol. Chem.* 1:3144-3146.
Arnold et al. (1987) "Evidence for Cryptand-Like Behavior in Bibracchial Lariat Ether (BiBLE) Complexes Obtained from X-Ray Crystallography and Solution Thermodynamic Studies," *J. Am. Chem. Soc.* 109:3716-3721.
Audier et al. (1981) "Crystallographic Orientations of Catalytic Particles in Filamentous Carbon; Case of Simple Conical Particles," *J. Cryst. Growth* 55:549-556.

(Continued)

*Primary Examiner*—Patrick Ryan
*Assistant Examiner*—Thomas H. Parsons
(74) *Attorney, Agent, or Firm*—Greenlee, Winner & Sullivan, P.C.

(57) ABSTRACT

Subfluorinated graphite fluorides of formula $CF_x$ wherein $CF_x$ is in the range of 0.06 to 0.63, e.g., 0.10 to 0.46, are used as electrode materials in electrochemical devices that convert chemical energy to electrical current, e.g., batteries. The invention additionally provides methods of manufacturing electrodes with the subfluorinated graphite fluorides, as well as primary and secondary batteries containing such electrodes.

60 Claims, 6 Drawing Sheets

U.S. PATENT DOCUMENTS

| | | | |
|---|---|---|---|
| 4,753,786 A | 6/1988 | Watanabe et al. | |
| 4,830,938 A | 5/1989 | McCullough et al. | |
| 4,840,859 A | 6/1989 | Williams et al. | |
| 4,865,931 A | 9/1989 | McCullough et al. | |
| 5,114,811 A | 5/1992 | Ebel et al. | |
| 5,116,592 A | 5/1992 | Weinberg | |
| 5,151,162 A | 9/1992 | Muller et al. | |
| 5,175,066 A | 12/1992 | Hamwi et al. | |
| 5,443,930 A | 8/1995 | Shoji et al. | |
| 5,518,836 A | 5/1996 | McCullough | |
| 5,532,083 A | 7/1996 | McCullough | |
| 5,534,370 A | 7/1996 | Kita et al. | |
| 5,702,844 A | 12/1997 | Bernard et al. | |
| 5,705,689 A | 1/1998 | Lee et al. | |
| 5,712,062 A | 1/1998 | Yamana et al. | |
| 5,916,642 A | 6/1999 | Chang | |
| 5,968,683 A | 10/1999 | Kolb | |
| 6,022,643 A | 2/2000 | Lee et al. | |
| 6,068,921 A | 5/2000 | Yamana et al. | |
| 6,077,624 A | 6/2000 | Mitchell et al. | |
| 6,100,324 A | 8/2000 | Choi et al. | |
| 6,120,941 A | 9/2000 | Lee et al. | |
| 6,203,814 B1 | 3/2001 | Fisher et al. | |
| 6,245,465 B1 | 6/2001 | Angell et al. | |
| 6,268,430 B1 | 7/2001 | Choi et al. | |
| 6,306,540 B1 | 12/2001 | Hiroi et al. | |
| 6,334,939 B1 | 1/2002 | Zhou et al. | |
| 6,352,798 B1 | 3/2002 | Lee et al. | |
| 6,358,649 B1 | 3/2002 | Yazami et al. | |
| 6,479,192 B1 | 11/2002 | Chung et al. | |
| 6,482,550 B1 | 11/2002 | Imachi et al. | |
| 6,489,055 B1 | 12/2002 | Ichihashi et al. | |
| 6,528,208 B1 | 3/2003 | Thackeray et al. | |
| 6,586,133 B1 | 7/2003 | Teeters et al. | |
| 6,589,299 B2 | 7/2003 | Missling et al. | |
| 6,638,662 B2 | 10/2003 | Takeuchi et al. | |
| 6,649,033 B2 | 11/2003 | Yagi et al. | |
| 6,709,566 B2 | 3/2004 | Cumings et al. | |
| 6,713,214 B2 | 3/2004 | Koga et al. | |
| 6,743,547 B2 | 6/2004 | Gan et al. | |
| 6,743,549 B1 | 6/2004 | Doyle et al. | |
| 6,767,671 B2 | 7/2004 | Itagaki et al. | |
| 6,841,610 B2 | 1/2005 | Yanagisawa | |
| 6,844,115 B2 | 1/2005 | Gan et al. | |
| 6,852,446 B2 | 2/2005 | Barbarich | |
| 6,852,449 B2 | 2/2005 | Nagata et al. | |
| 6,926,991 B2 | 8/2005 | Gan et al. | |
| 6,939,383 B2 | 9/2005 | Eastin et al. | |
| 6,958,198 B2 | 10/2005 | Iwamoto et al. | |
| 6,986,967 B2 | 1/2006 | Barton et al. | |
| 7,005,211 B2 | 2/2006 | Kim et al. | |
| 7,074,523 B2 | 7/2006 | Arai et al. | |
| 7,087,348 B2 | 8/2006 | Holman et al. | |
| 2002/0081492 A1 | 6/2002 | Gan et al. | |
| 2002/0119371 A1 | 8/2002 | Haug et al. | |
| 2002/0127171 A1 | 9/2002 | Smalley et al. | |
| 2002/0177041 A1 | 11/2002 | Worle et al. | |
| 2002/0182506 A1 | 12/2002 | Cagle | |
| 2003/0003370 A1 | 1/2003 | Arai et al. | |
| 2003/0049535 A1 | 3/2003 | Ohta et al. | |
| 2003/0108799 A1 | 6/2003 | Lascaud et al. | |
| 2003/0158310 A1 | 8/2003 | Asano et al. | |
| 2003/0224168 A1 | 12/2003 | Mack et al. | |
| 2004/0013814 A1 | 1/2004 | Guerfi et al. | |
| 2004/0131859 A1 | 1/2004 | Chen et al. | |
| 2004/0048160 A1 | 3/2004 | Omaru | |
| 2004/0058247 A1 | 3/2004 | Omaru | |
| 2004/0091783 A1 | 5/2004 | Cagle | |
| 2004/0106047 A1 | 6/2004 | Mie et al. | |
| 2004/0258986 A1 | 12/2004 | Shen et al. | |
| 2005/0006623 A1 | 1/2005 | Wong et al. | |
| 2005/0011710 A1 | 1/2005 | Hitchcock et al. | |
| 2005/0026044 A1 | 2/2005 | Koike et al. | |
| 2005/0069778 A1 | 3/2005 | Bonnet et al. | |
| 2005/0118512 A1 | 6/2005 | Onuki et al. | |
| 2005/0123835 A1 | 6/2005 | Sun | |
| 2005/0170251 A1 | 8/2005 | Jung et al. | |
| 2005/0207966 A1 | 9/2005 | Zaghib | |
| 2005/0227146 A1 | 10/2005 | Ghantous et al. | |
| 2006/0269834 A1 | 11/2006 | West et al. | |
| 2007/0037063 A1 | 2/2007 | Choi et al. | |

FOREIGN PATENT DOCUMENTS

| | | |
|---|---|---|
| EP | 1 028 476 | 8/2000 |
| EP | 1 551 069 | 7/2005 |
| FR | 2856674 | 12/2004 |
| JP | 11214037 | 8/1999 |
| JP | 2000106188 | 4/2000 |
| JP | 2000200604 | 7/2000 |
| JP | 2003187799 | 7/2003 |
| JP | 2005113361 | 4/2005 |
| JP | 2005285440 | 10/2005 |
| SU | 584369 | 12/1977 |
| WO | WO 97/02580 | 1/1997 |
| WO | WO 99/18624 | 4/1999 |
| WO | WO 99/34470 | 7/1999 |
| WO | WO 01/09972 | 2/2001 |
| WO | WO 01/33656 | 5/2001 |
| WO | WO 01/41246 | 6/2001 |
| WO | WO 01/94260 | 12/2001 |
| WO | WO 02/03430 | 1/2002 |
| WO | WO 03/004410 | 1/2003 |
| WO | WO 03/031050 | 4/2003 |
| WO | WO 03/040446 | 5/2003 |
| WO | WO 2004/001888 | 12/2003 |
| WO | WO 2004/051784 | 6/2004 |
| WO | WO 2004/088769 | 10/2004 |
| WO | WO 2004/090921 | 10/2004 |
| WO | WO2004/096704 | 11/2004 |

OTHER PUBLICATIONS

Banerjee et al. (2003) "Rational Chemical Strategies for Carbon Nanotube Functionalization," *Chem. Eur. J.* 9:1898-1908.

Basire et al. (2000) "Evolution of the Lamellar Structure During Crystallization of a Semicrystalline-Amorphous Polymer Blend: Time-Resolved Hot-Stage SPM Study," *Phys. Rev. Lett.* 85:5587-5590.

Beer et al. (2003) "Transition Metal and Organometallic Anion Complexation Agents," *Coord. Chem. Rev.* 240:167-189.

Bertani et al. (1999) "$^{19}F/^{29}Si$ Distance Determination in Fluoride-Containing Octadecasil by Hartmann-Hahn Corss-Polarization Under Fast Magic-Angle Spinning," *Solid State Magn. Res.* 13:219-229.

Bethune et al. (1993) "Cobalt-Catalyzed Growth of Carbon Nanotubes with Single-Atomic0Layer Walls," *Nature* 363:605-607.

Bitter et al. (1998) "Studies on Calix(aza)crowns, II. Synthesis of Novel Proximal Doubly Bridged Calix[4]arenes by Intramolecular Ring Closure of Syn 1,3- and 1,2- to ω-Chloraolkylamides," *Tetrahedron* 54:3857-3870.

Blesa et al. (2006) "Bis(calixcrown)tetrathiafuvalene Receptors," *Chem. Eur. J.* 12:1206-1914.

Blumberg, W.E. (1960) "Nuclear Spin Lattice Relaxation Caused by Paramagnetic Impurities," *Phys. Rev.* 119:79-84.

Bonnamy et al. (1999) "Carbonization of Various Precursors. Effect of Heating Rate: Part II: Transmission Electron Microscopy and Physicochemical Studies," *Carbon* 37:1707-1724.

Bonnamy et al. (1999) "Carbonizaion of Various Preursors. Effect of Heating Rate: Part I: Optical Microscopy Studies," *Carbon* 37:1691-1705.

Bourderau et al. (1999) "Amorphous Silicon as a Possile Anode Material for Li-ion Batteries," *J. Power Sources* 81:233-236.

Bruce, G. (2005) "Development of a CFx D Cell for Man Portable Apllications," In; Joint Service Power Expo, Power Point Presentation.
Cassell et al. (1999) "Large Scale CVD Synthesis of Single-Walled Carbon Nanotubes," *J. Phys. Chem. B* 103(31):6484-6492.
Chamssedine et al. (2007) "Reactivity of Carbon Nanofibers with Fluorine Gas," *Chem. Mater.* 19:161-172.
Chevalier et al. (1994) "Anionic Intercalation in $La_2CuO_4$ Oxide by Fluorine or Chlorine Treatment," *Mol. Cryst. Liq. Cryst.* 244:135-142.
Cheng et al. (1998) "Large-Scale and Low-Cost Synthesis of Single-Walled Carbon Nanotubes by the Catalytic Pyrolysis of Hydrocarbons," *Appl. Phys. Lett.* 72(25):3282-3284.
Chiang et al. (2001) Purification and Characterization of Single-Walled Carbon Nanotubes (SWNTs) Obtained from the Gas-Phase Decomposition of CO (HiPco Process) *J. Phys. Chem. B* 105:8297-8301.
Chieu et al. (1982) "Raman Studies of Benzene-Derived Graphite Fibers," *Phys. Rev. B* 26:5867-.
Chung et al. (1995) "Electrochemical Behavior of Calix[4]arenediquinones and Their Cation Binding Properties," *J. Electroanalytical Chem.* 396:431-439.
Dahn et al. (2000) "Energy and Capacity Projections for Practical Dual-Graphite Cells," *J. Electrochem. Soc.* 147(3):899-901.
De Jong et al. (2000) "Carbon Nanofibers: Catalytic Synthesis and Applications," *Catalysis Reviews-Science and Engineering* 42:481-510.
Derf et al. (2001) "Tetrathiafulvalene Crowns: Redox Switchable Ligands," *Chem. Eur. J.* 7(2):447-455.
Dietrich (1993) "Desgn of Anion Receptors: Applications," *Pure Apple. Chem.* 65(7):1457-1464.
Ding et al. (2001) "Change of Conductivity with Salt Content, Solvent Composition, and Temperature for Electrolytes of LiPF6 in Ethylene Carbonate-Ethyl Methyl Carbonate," *J. Electrochem. Soc.* 148(10):A1196-A1204.
Dresselhaus et al. (1981) "Intercalation Compounds of Graphite," *Adv. Phys.* 30(2):139-326.
Dubois et al. (2006) "EPR and Solid-State NMR Studies of Poly(dicarbon monofluorie) $(C_2F)_n$," *J. Phys. Chem. B.* 110:11800-11808.
Dubois et al. (2004) "NMR and EPR Studies of Room Temperature Highly Fluorinated Graphite Heat-Treated Under Fluorine Atmosphere," *Carbon* 42:1931-1940.
Duclaux, L. (2002) "Review of the Doping of Carbon Nanotubes (Multiwalled and Single-Walled)," *Carbon* 40:1751-1764.
Duesberg et al. (1998) "Chromatographic Size Separation of Single-Wall Carbon Nanotubes," *Appl. Phys. A* 67:117-119.
Duijvestjn et al. (1983) "$^{13}C$ NMR Spectroscopy in Diamonds Using Dynamic Nuclear Polarization," *Chem. Phys. Lett.* 102:25-28.
Ehrlich, G.M. (2001) "Lithium-Ion Batteries," In; *Handbook of Batteries*, $3^{rd}$ ed., Ch. 35, New York, McGraw Hill, pp. 35.1-35.90.
Endo, M. (1988) "Grow Carbon Fibers in the Varpor Phase," *Chemtech* :568-576.
Feng et al. (2003) "Removal of Some Impurities From Carbon Nanotubes," *Chem. Phys. Lett.* 375:645-648.
Frank et al. (1975) "Preparation and Crystal-Structure of $Li_3SN_5$ and Structural Relations Between Phases of Systems Li-SN and Li-PB," *Z. Naturforsch. B* 30:316-322.
Furdin, G. (1998) "Exfoliation Process and Elaboration of New Carbonaceous Material," *Fuel* 77(6):479-485.
Giraudet et al. (2006) "Solid-State NMR Studies of Covalent Graphite Fluorides $(CF)_n$ and $(C_2F)_n$," *J. Phys. Chem. Solids* 67(5-6):1100-1105.
Giraudet et al. (2005) "Solid-State $^{19}F$ and $^{13}C$ NMR of Room Temperature Fluorinated Graphite and Samples Thermally Treated Under Fluorine: Low-Field and High-Resolution Studies," *J. Solid State Chem.* 118:1262-1268.
Giraudet et al. (2005) "Solis-State NMR ($^{19}F$ and $^{13}C$) Study of Graphite Monofluoride $(CF)_n$: 19F Spin;Lattice Magnetic Relaxation and 19F/13C Distance Determination by Hartmann-Hahn Cross Polarization," *J. Phys. Chem. B* 109:175-181.
Gladyshevskii et al. (1964) "New Examples of the Structural Type $Li_{22}Pb_5$," *Sov. Phys. Crystallogr.* 9(3):269-271.

Gokel et al. (2000) "Experimental Evidence for Alkali Metal Cation—π Interactions," *Eur. J. Chem.* :2967-2978.
Guerin et al. (2004) "Hybrid-Type Graphite Fluoride as Cathode Material in Promary Lithium Batteries," *Electrochem. Solid-State Lett.* 7(6):A159-A162.
Gupta et al. (2003) "A Study on the Formation Mechanism of Graphite Fluorides by Raman Spectroscopy," *J. Fluorine Chem.* 120:143-150.
Hafner et al. (1998) "Catalytic Growth of Single-Wall Carbon Nanotubes From Metal Particles," *Chem. Phys. Lett.* 296(1-2):195-202.
Hagaman et al. (1998) "Solid-State $^{13}C$ and $^{19}F$ NMR Characterization of Fluorinated Charcoal," *Energy & Fuel* 12:399-408.
Hamwi et al. (1997) "Fluorination of Carbon Nanotubes," *Carbon* 35:723-728.
Hamwi et al. (1998) "Electrochemical Properties of Carbon Nanotube Fluorides in a Lithium Cell System," *Mol. Cryst. Liq. Cryst.* 310:185-190.
Hamwi, A. (1996) "Fluorine Reactivity with graphite and Fullerenes. Fluoride Derivatives and Some Practical Electrochemical Applications," *J. Phys. Chem. Solids* 57(6-8):677-688.
Hany et al. (1997) "Low-Temperature Carbon Fluoride for High Power Density Lithium Primary Batteries," *J. Power Sources* 68(2):708-710.
Harris, P. (1999) *Carbon Nanotubes and Related Structures*, Cambridge University Press, Cambridge, pp. 103.
Harutyunyuan et al. (2002) "Purification of Single-Wall Carbon Nanotubes by Selective Microwave Heating of Catallyst Particles," *J. Phys. Chem. B* 106:8671-8675.
Holzinger et al. (2000) "A New Purification Method for Single-Wall Carbon Nanotubes (SWNTs)," *Appl. Phys. A* 70:599-602.
Hopf et al. (1972) "Structure of the Lithium Germanide Phase $Li_7Ge_2$," *Z. Naturforsch. B* 22:1157-1160.
Iijima, S. (1991) "Helical Microtubules of Graphite Carbon," *Nature* 354:56-58.
Iijima et al. (1993) "Single-Shell Carbon Nanotunbes 1-nm Diameter," *Nature* 363:603-605.
Inagaki et al. (2004) "Exfoliation Process of Graphite Via Intercalation Compounds with Sulfuric Acid," *J. Phys. Chem. Solids* 65:133-137.
Inagaki et al. (1994) "Graphite Exfoliation at Room Temperature and its Structural Annealing," *Carbon* 32(7):1253-1257.
International Search Report Coressponding to International Application No. PCT/US07/62518, Mailed Sep. 27, 2007.
International Search Report Corresponding to International Application No. PCT/US05/08897, Mailed Aug. 28, 2006.
International Search Report corresponding to International Application No. PCT/US03/28395, Mailed Feb. 8, 2005.
Johansson, P. (2006) "Intrinsic Anion Oxidation Potentials," *J. Phys. Chem.* 110:12077-12080.
Johnson et al. (1965) "The Crystal Structure of $Li_{15}Ge_4$," *Acta. Cryst.* 18:131-132.
Journet et al. (1997) "Large-Scale Production of Single-Walled Carbon Nanotubes by the Electric-Arc Technique," *Nature* 388:756-758.
Kelly et al. (1999) "Insight into the Mechanicsm of Sidewall Functionalization of Single-Walled Nanotubes: An STM Study," *Chem. Phys. Lett.* 313:445-450.
Kitiyanan et al. (2000) "Controlled Production of Single-Wall Carbon Nanotubes by Catalytic Decomposition of CO on Bimetallic Co-Mo Catalysts," *Chem. Phys. Lett.* 317(3-5):497-503.
Knight et al. (1980) "Characterization of Diamond Films by Ranan Spectroscopy," *J. Mater Res.* 4:385-393.
Kovtyukhova et al. (2003) "Individual Single-Walled Nanotubes and Hydrogels Made by Oxidative Exfoliation of Carbon Nanotube Ropes," *J. Am. Chem. Soc.* 125:9761-9769.
Krawietz et al. (1998) "Characterization of Poly(carbon monofluoride) by 19F and 19F to 13C Cross Polarization MAS NMR Spectroscopy," *Chem. Commun.* 19:2151-2151.
Kuga et al. (1993) "Laser-Assisted Exfoliation of Potassium-Ammonia-Graphite Intercalation Compounds," *Carbon* 31(1):201-204.
Kuriakose et al. (1965) "Kinetics of Reactions of Elemental Fluorine. IV. Fluorination of Graphite," *J. Phys. Chem.* 69:2272-2274.

Lee et al. (2003) "The Physiochemical Characteristics of Modified Carbon Fibers by Fluorination," *Korean J. Chem. Eng.* 20(1):151-156.

Lee et al. (2004) "Synthesis of a Series of Fluorinated Boronate Compounds and Tehir Uses as Additives in Lithium Battery Electrolytes," *J. Electrochem. Soc.* 151(9):A1429-1435.

Lee et al. (Aug. 1998) "The Synthesis of a New Family of Boron-Based Anion Receptors and The Study of Their Effect on Ion Pair Dissociation and Conductivity of Lithium Salts in Nonaqueous Solutions," *J. Electrochem. Soc.* 145(8):2813-2818.

Limthongkul et al. (2003) "Electorchemically-Driven Solid-State Amorphization in Lithium-Silicon Alloys and Implications for Lithium Storage," *Acta Materialia* 51:1103-1113.

Linden et al. (2001) "Lithium Batteries," In; *Handbook of Batteries*, $3^{rd}$ ed., Ch. 14, New York, McGraw Hill, pp. 14.1-14.99.

Liu et al. (1998) "Fullerene Pipes," *Science* 280:1253-1256.

Liu et al. (2005) "Versatile Self-Complexing Compounds Based on Covalently Linked Donoe-Acceptor Cyclophanes," *Chem. Eur. J.* 11:369-385.

Magasinski et al. (2002) "Graphitization, Intercalation, and Exfoliation of Cokes and Anthracites: A Comparative Study," *Fuel Processing Technol.* 79(3):259-264.

Mark et al. (1986) "Electron-Transfer Polymers," In; Encyclopedia of Polymer Science and Engineering, $2^{nd}$ ed., vol. 5, Wiley, pp. 725-755.

Menges et al. (1969) "Crystal Structure of Lithium Germanide, A New Type of Three-Dimensional Bonding of Element(IV) Atoms," *Z. Naturforsch.* B 24:1351-1352.

Messaoudi et al. (1991) "Chemical-Reduction of $FeCl_3$-Graphite Intercalation Compounds with Potassium Naphalene Complex in Tetrahydrofuran," *J. Mater. Chem.* 1(5):735-738.

Mickelson et al. (1998) "Fluorination of Single-Wall Carbon Nanotubes," *Chem. Phys. Lett.* 296:188-194.

Mittkin et al. (2003) "Types of Inorganic Fluorocarbon Polymer Materials and Structure-+roperty Correlation Problems," *J. Struct. Chem.* 44:82-115 (Translated from *Zhurnal Structunoi Khimii* 44:99-138).

Mochida et al. (2000) "Chemistry of Synthesis, Structure, Preparation and Application of Aromatic-Derived Mesophase Pitch," *Carbon* 38:305-328.

Nakajima, T. (1995) "Synthesis, Structure, and Physicochemical Properties of Fluorine-Graphite Intercalation Compounds," In; *Fluorine-Carbon and Fluoride-Carbon Materials*, Marcel Dekkler, New York, pp. 1-31.

Nakamizo et al. (1974) "Laser Raman Studies on Carbons," *Carbon* 12:259-267.

Nasimbulin et al. (2005) "Synthesis of Nanoparticles Using Vapor-Phase Decomposition of Copper(II) Acetylacetonate," *Colloid J.* 67(1):1-20.

Nazri, M. (2004) "Liquid Electrolytes: Some Theoretical and Practical Aspects," In; *Lithium Batteries Science and Technology*, Ch. 17, Kluer Academic Publisherss, pp. 509-573.

Nemanich et al. (1977) "Raman Scattering from Intercalated Donor Compounds of Graphite," *Phys. Rev. B* 16(6):2965-2972.

Nesper (1990) "Structure and Chemical Bonding in Zintl-Phases Containing Lithium," *Prog. Solid-State Chem.* 20:1-45.

Oberlin et al. (1989) "High-Resolution TEM Studies of Carbonization and Graphitization," *Chemistry and Physics of Carbon*, Thrower, P.A. ed., vol. 22, New York, Marcel Dekker, pp. 1-143.

Okotrub et al. (2000) "Fluorinated Cage Multiwall Carbon Nanoparticles," *Chem. Phys. Lett.* 323:231-236.

Osswald et al. (2005) "Elimination of D-Band in Raman Spectra of Double-Wall Carbon Nanotubes by Oxidation," *Chem. Phys. Lett.* 402:422-427.

Panich A.M. (1999) "Nuclear Magnetic Resonance Study of Fluorine-Graphite Intercalation Compounds and Graphite Fluorides," *Synth. Matals* 100:169-185.

Panich et al. (2001) "On Paramagnetism in Fluorinated Graphite: EPR and Solid-State NMR Study," *J. Phys. Chem. Solids* 62:959-964.

Petitjean et al. (1994) "Exothermic Exfoliation of Graphite-Intercalation Compounds Containing Perchloric-Acid," *Carbon* 32(3):461-467.

Piotrowski et al. (2001) "Self-Assembled Organometallic [12]Metallacrown-3 Complexes," *Chem. Eur. J.* 7(15):3197-3207.

Press et al. (1988) *Numerical Recipes in C, The Art of Scientific Computing*, Plenum Press, New York.

Rao et al. (1992) "Raman-Scattering and Transmission-Electron-Microscopy Studies of Fluorine-Intercalated Graphite Fibers CxF ($7.8 \geqq x \geqq 2.9$)," *Phys. Rev. B* 45:6883-6892.

Rinzler et al. (1998) "Large-Scale Purification of Single-Wall Carbon Nanotubes: Process, Product, and Characterization," *Appl. Phys. A* 67:29-37.

Rudorf et al. (1947) "Zur Konstitution des Kohlenstoff-Monofluorides," *Z. Anorg. Allg. Chem.* 253:281-296.

Ruff et al. (1934) "Die Reaktionsprodukte der verschiedenen Kohlenstoffformen mit Fluor II (Kohlenstoff-monofluoride)," *Z. Anorg. Allg. Chem.* 217:1-18.

Sano et al. (2002) "Properties of Carbon Onions Produced by an Arc Discharge in Water," *J. Appl. Phys.* 92(5):2783-2788.

Sato et al. (2004) "On the So-Called 'Semi-Ionic' C-F Bond Character in Fluorine-GIC," *Carbon* 42:3243-3249.

Seel et al. (2000) "Electrochemical Intercalation of $PF_6$ into Graphite," *J. Electrochem. Soc.* 147(3):892-898.

Shundrin et al. (2004) "The Electrochemical Oxidation of Polyfluorophenyltrifluoroborate Anions in Acetonitrile," *Z. Anorg. Allg. Chem.* 630:1253-1257.

Singh et al. (2006) "Study of Interactions of Various Ionic Species with Solvents Toward the Design of Receptors," *Theor. Chem. Acc.* 115:127-135.

Skowronski et al. (2004) "Electrochemical Intercalation of $ZnCl_2$-$CrO_3$-GIC (Graphite Intercalation Compound) with Sulfuric Acid," *Polish J. Chem.* 78:1339-1344.

Steed, J.W. (2001) "First- and Second Sphere Coordination Chemistry of Alkali Metal Crown Ether Complexes," *Coord. Chem. Rev.* 215:171-221.

Stein et al. (1987) "Π-Electron Properties of Large Condensed Polyaromatic Hydrocarbons," *J. Am. Chem. Soc.* 109:3721-3729.

Su et al. (2000) "A Scalable CVD Method for the Synthesis of Single-Walled Carbon Nanotubes with High Catalyst Productivity," *Chem. Phys. Lett.* 322(5):321-326.

Sun et al. (2003) "The Compatibility of a Boron-Based Anion Receptor with the Carbon Anode in Lithium-Ion Bateries," *Electorchem. Solid-State Lett.* 6(2):A43-A46.

Sun et al. (1998) "A Novel Lithium Battery Electrolyte Based on Lithium Fluoride and a Tris(pentafluorophenyl) Borane Anion Receptor in DME," *Electrochem. Solid-State Lett.* 1(6):239-240.

Takai et al. (2000) "Fluorine-Introduced sp3-Carbon Sites in a Nano-Sized pi-Electron System and Their Effects on the Electronic Properties," *Mol. Cryst. Liq. Cryst.* 340:289-294.

Takenobu et al. (2003) "Hydrogen Storage in $C_{70}$ Encapsulated Single-Walled Carbon Nanotube," *Synthetic Metals* 135-136:787-788.

Thess et al. (1996) "Crystalline Ropes of Metallic Carbon Nanotubes," *Science* 273:483-487.

Touhara et al. (2000) "Property Control of Carbon Materials by Fluorination," *Carbon* 38:241-267.

Touhara et al. (2002) "Property Control of New Forms of Carbon Materials by Fluorination," *J. Fluorine Chem.* 114:181-188.

Touhara et al. (1987) "Electrochemical Characteristics of Fluorine Intercalated Graphite Fiber-Lithium Cells," *Electrochemica Acta* 32(2):293-298.

Touhara et al. (2004) "Fluorination of Cup-Stacked Carbon Nanotubes, Structure and Properties," Materials Research Society Fall Meeting Proceedings, MRS Proceedings vol. 858E, Abstract No. HH12.3.

Toyoda et al. (2004) "Exfoliation of Carbon Fibers," *J. Phys. Chem. Solids* 65:109-117.

Tuinstra et al. (1970) "Raman Spectrum of Graphite," *J. Chem. Phys.* 53(3):1126-1130.

Ue et al. (2002) "Anodic Stability of Several Anions Examined by AB Initio Molecular Orbital and Density Functional Theories," *J. Electrochem. Soc.* 149(12):A1572-A1577.

Ue et al. (2006) "Electrochemical Properties of $Li[C_nF_{2n+1}BF_3]$ as Electrolyte Salts for Lithium-Ion Cells," *Solid State Ionics* 177:323-331.

Watanabe et al. (1988) "Graphite Intercalation Compound of Fluorine," In; *Graphite Fluorides*, Elsevier, Amsterdam, Ch. 8, pp. 240-261.

Wantanabe et al. (1988) "Lithium-Graphite Fluoride Battery," In; *Graphite Fluorides, Elsevier*, Amsterdam, Ch. 5, pp. 148-203.

Wantanabe et al. (1988) "Preparation, Stoichiometry and Structure of Graphite Fluoride," In; *Graphite Fluorides*, Elsevier, Amsterdam, Ch. 2, pp. 23-89.

Watanabe, N. (1981) "Characteristics and Applications of Graphite Fluoride," *Physica B* 105:17-21.

Whitacre et al. (Sep. 2006) "Low Operational Temperature Li-CFx Batteries Using Cathodes Containing Sub'Fluorinated GraphiteMaterials," *J. Power Sources* 160:577-584.

Wilkie et al. (1979) "The Solid-State $^{13}$C-NMR and $^{19}$F-NMR Spectra of Some Graphite Fluorides," *J. Solid State Chem*. 30:197-201.

Winter et al. (2004) "Carbonaceous and Graphitic Anodes," In; *Lithium Batteries Science and Technology*, Ch. 5, Kluer Academic Publisherss, pp. 144-194.

Woo et al. (2003) "Structural Characteristics of Carbon Nanorods and Nanotubes Grown Using Electron Cyclotron Resonance Chemical Vapor Deposition," *J. Appl. Phys*. 94(10):6789-6795.

Xu et al. (2004) "Nonaqueous Liquid Electrolytes for Lithium-Based Rechanrgeable Batteries," *Chem. Rev*. 104:4303-4417.

Yang et al. (2002) "Characteristics and Carbonization Behaviors of Coal Extracts," *Fuel Processing Technol*. 70:207-215.

Yazami et al. (2006) "The Kinetics of Sub-Fluorinated Carbon Fluoride Cathods for Lithium Battereis," Meeting Abstracts, Electrochem Soc., 210$^{th}$ ECS Meeting, Oct. 29-Nov. 3, Cancun Mexico Abstract #235.

Yokomichi et al. (2000) "Temperature Dependence of Electron Spin Resonance in Fluorinated Amorphous Carbon Films," *J. Non-Cryst. Solids* 266:797-802.

Yokomichi et al. (1998) "Preparation of Fluorinated Amorphous Carbon Thin Films," *J. Non-Cryst. Solids* 227:641-644.

Yoshida et al. (1991) "Exfoliated Graphite from Various Intercalation Compounds," *Carbon* 29(8):1227-1231.

Zhao et al. (2005) "A Calixarene-Amide-tetrathiafulvalene Assembly for the Electrochemical Detection of Anion," *New J. Chem*. 29:1164-1167.

Zheng et al. (2002) "CVD Synthesis and Purification of Single-Walled Carbon Nanotubes on Aerogel-Supported Catalyst," *Appl. Phys*. A74:345-348.

Zhou et al. (2005) "Li[$C_2F_5BF_3$] as an Electrolyte Salt for 4 V Class Lithium-Ion Cells," *J. Electrochem. Soc*. 152(2):A351-A356.

Arora et al. (2004) "Battery Separators," *Chem. Rev.*, 104:4419-4462.

Bulusheva et al. (2002) "Atomic Arrangement and Electronic Structure of Graphite Fluoride C2F," *Phys. Low-Dim. Struct*. 7/8:1-14.

Charlier et al. (1993) "First Principles Study of Graphite Monofluoride $(CF)_{n_1}$," *Phys. Rev. B*, 47:16162-16168.

Davidson (2003) "Lithium Batteries, Molecular Expressions, Electricity and Magnetism," Florida State Univ., http://micro.magnet.fsu.edu/electromag/electricity/batteries/lithium.html.

Ebert et al. (1974) "Carbon Monofluoride. Evidence for a Structure Containing an Infinite Array of Cyclohexane Boats," *J. Am. Chem. Soc.*, 96:7841-7842.

Fujimoto (1997) "Structure Analysis of Graphite Fluoride by Rietveld Method," *Carbon*, 35:1061-1065.

Graetz et al. (2003) "Highly Reversible Lithium Storage in Nanostructured Silicon," *Electrochemical and Solid-State Letters*, 6(9) A194-A197.

Gupta et al. (2001) "Raman Scattering Study of Highly Fluorinated Graphite," *J. Fluorine Chem.*, 110:145-151.

International Search Report Corresponding to PCT/US 05/37871, Mailed Apr. 19, 2006.

Jacobs (2005) Lithium Battery Basics, Machine Design, www.machinedesign.com/ASP/strArticleID/55501/strSite/MDSite/viewSelected Art.asp.

Jacobs (2005) "Long-lasting Lithiums," Electron. Comm Technol., http://dataweek/co.za/Article.ASP?pklArticleID=455.

Kita et al. (1979) "Chemical Composition and Crystal Structure of Graphite Fluoride," *J. Am. Chem. Soc.*, 101:3832-3841.

Lam et al. (Jun. 27, 2005) "Physical Characteristics and Rate Performance (CFx)n (0.33<x>0.66) in Lithium Batteries,"*J. Power Sci.* 153:354-359.

Li et al. (2000) "The Crystal Structural Evolution of Nano-Si Anode Caused by Lithium Insertion and Extraction at Room Temperature," *Solid State Ionics*, 135:181-191.

Li et al. (1999) "A High Capacity Nano-Si Composite Anode Material for Lithium Rechargeable Batteries," *Electrochemical and Solid-State Letters*, 2(11) 547-549.

Mitkin et al. (2002) "X-ray Photoelectron and Auger Spectroscopic Study of Superstoichiometric Fluorographite-Like Materials," *J. Struct. Chem.*, 43:843-855.

Morita et al. (1980) "Evaluation of Cathode Materials for the Lithium/Carbonmonofluride Battery," *J. Power Sources* 5:111-125.

Nakajima et al. (1999) "Electrochemical Behavior of Surface-Fluorinated Graphite," *Electrochem. Acta*, 44:2879-2888.

Nanse et al. (1997) "Fluorination of Carbon Blacks: An X-Ray Photoelectron Spectroscopy Study: I. A literature Review of XPS Studies of Fluorinated Carbons. XPS investigation of some reference compounds," *Carbon*, 35:175-194.

Ohara et al. (2003) "Li Insertion/Extraction Reaction at a Si Film Evaporated on a Ni Foil," *Journal of Power Sources*, 119-121.

Pelikan et al. (2003) "On the Structural and Electronic Properties of Poly(dicarbon monofluoride); Solid-State Semi-Empirical INDO Study," *J. Solid State Chem.*, 174:233-240.

Pilarzyk "Lithium Carbon Monofluoride Coin Cells in Real-Time Clock and Memory Backup Applications," *Rayovac, White Papers*, http://www.rayovac.com/technical/wp_lithium.htm.m Downloaded Oct. 17, 2005.

Sayama et al. (2002) "New Active Material Structure in Si Thin Film Electrode for Rechargable Lithium Batteries," The 11$^{th}$ International Meeting on Lithium Batteries, Abstract 52, Monterey, CA, Jun. 23-28, 2002.

Shneyder "Two-Dimensional Oxidation of SiGe," 69-71, http://www.nnf.cornell.edu/1999REU/ra/Schnevder.pdf.

Takamura et al. (2002) "Li Insertion/Extraction Reaction of a Si Film Evaporated on Ni Foil," The 11$^{th}$ International Meeting on Lithium Batteries, Abstract 257, Monterey, CA, Jun. 23-28, 2002.

Touhara et al. (1987) "On the Structure of Graphite Fluoride," *Anorg. All. Chem.*, 544:7-20.

Whittingham (1975) "Mechanism of Reduction of Fluorographite Cathode," *J. Electrochem. Soc.*, 122:526-527.

Zajac et al. (2000) "The Structure and Properties of Graphite Monofluoride Using the Three-Dimensional Cyclic Cluster Approach," *J. Solid State Chem.*, 150:286-293.

Zhou et al. (1999) "Controlled Li Doping of Si Nanowires by Electrochemical Insertion Method," *Applied Physics Letters*, 75(16):2447-2449.

Author (Unknown), 2004, "Meeting the Energy Need of Future Warriors," *National Academic Press*, www.nap.edu/openbook/0309092612/html/91.html, Downloaded Oct. 14, 2005.

Author (Unknown), 2004, "Meeting the Energy Need of Future Warriors," *National Academic Press*, www.nap.edu/openbook/0309092612/html/88.html, Downloaded Oct. 14, 2005.

Author (Unknown), "Lithium Batteries," Panasonic ideas for Life, Product brochure, www.panasonic.com/industrial/battery/oem/chem/lith/index.html, Downloaded Oct. 14, 2005.

Author (Unknown), 2000-2005, PowerStream Battery Chemistry FAQ, PowerStream Technology, www.powerstream.com/BatteryFAQ.html, Last Updated Aug. 17, 2003.

Nakajima et al. (1991) "Synthesis and Structures of Graphite Fluorides," In; *Graphite, Fluorides and Carbon-Fluorine Compounds*, Ch. 2, CRC Press, Boca Raton, FL, pp. 11-41.

Nakajima et al. (1991) "Lithium-Graphite Fluoride Battery," *Graphite, Fluorides and Carbon-Fluorine Compounds*, Ch. 4, CRC Press, Boca Raton, FL, pp. 77-109.

Lagow et al. (1974) "Some new synthetic approaches to graphite-fluorine chemistry," *J. Chem. Soc., Dalton Trans.*, 1268-1273.

Watanabe et al. (1974) "Vapor Phase Amination Reaction of Phenol Over Solid Acid Catalysts," *Nippon Kagaku Kaishi*, 3:540-544.

Wood et al. (1973) "Thermodynamic, electrochemical, and synthetic studies of the graphite-fluorine compounds fluoromethylidyne and carbon fluoride ($c_4$ F)," *Chemical Abstracts*, vol. 78, p. 366.

SUBFLUORINATED GRAPHITE FLUORIDES AS ELECTRODE MATERIALS

CROSS REFERENCE TO RELATED APPLICATION

This application is a Continuation-in-Part of U.S. patent application Ser. No. 11/253,360, filed Oct. 18, 2005, which claims the benefit under 35 U.S.C. 119(e) of U.S. Provisional Patent Application No. 60/724,084 filed on Oct. 5, 2005, and the present application also directly claims the benefit under 35 U.S.C. 119(e) of U.S. Provisional Patent Application No. 60/724,084 filed on Oct. 5, 2005; all of which are hereby incorporated by reference in their entireties to the extent not inconsistent with the disclosure herein.

FIELD OF THE INVENTION

This invention relates generally to electrode materials, and more particularly relates to the use of fluorinated carbon, particularly subfluorinated graphite fluorides, as electrode materials in electrochemical devices for generating electrical current, e.g., lithium batteries.

BACKGROUND OF THE INVENTION

Since the pioneering work of Ruff et al. (1934) *Z. Anorg. Allg. Chem.* 217:1, and of Rudorff et al. (1947) *Z. Anorg. Allg. Chem.* 253:281, graphite has been known to react with elemental fluorine at high temperatures to yield graphite fluoride compounds of general formula $(CF_x)_n$. Systematic studies on the fluorination reaction later showed that the resulting F/C ratio is largely dependent on the fluorination temperature, the partial pressure of the fluorine in the fluorinating gas, and physical characteristics of the graphite precursor, including the degree of graphitization, particle size, and specific surface area. See Kuriakos et al. (1965) *J. Phys. Chem.* 69:2272; Nanse et al. (1997) *Carbon* 35:175; Morita et al. (1980) *J. Power Sources* 5:111; Fujimoto (1997) *Carbon* 35:1061; Touhara et al. (1987) 2. *Anorg. All. Chem.* 544:7; Watanabe et al. (1974) *Nippon Kagaku Kaishi* 1033; and Kita et al. (1979) *J. Am. Chem. Soc.* 101:3832.

The crystal structure of highly fluorinated graphite fluorides, i.e., $(CF_x)_n$ compounds with x>>0.5, has been investigated by several groups (Nakajima et al., *Graphites, Fluorides and Carbon-Fluorine Compounds*, CRC Press, Boca Raton, Fla., p. 84; Charlier et al. (1994) *Mol. Cryst. Liq. Cryst.* 244:135; Charlier et al. (1993), *Phys. Rev. B* 47:162; Mitkin et al. (2002) *J. Struct. Chem.* 43: 843; Zajac et al. (2000) *J. Sol. State Chem.* 150:286; Gupta et al. (2001) *J. Fluorine Chem.*, 110-245; Ebert et al. (1974) *J. Am. Chem. Soc.* 96:7841; Pelikan et al. (2003) *J. Solid State Chem.* 174: 233; and Bulusheva et al. (2002) *Phys. Low-Dim. Struct.* 718:1). The Watanabe group first proposed two phases: a first stage, $(CF_1)_n$, and a second stage, $(CF_{0.5})_n$, the latter also commonly referred to as $(C_2F)_n$ (Touhara et al., supra). In first stage materials, the fluorine is intercalated between each carbon layer to yield stacked CFCF layers, whereas in second stage materials, fluorine occupies every other layer with a stacking sequence of CCFCCF. Hexagonal symmetry was found to be preserved in both $(CF_1)_n$ and $(CF_{0.5})_n$ phases. Theoretical crystal structure calculations were also carried out and different layer stacking sequences were compared using their total energy (Charlier et al. (1994), supra; Charlier et al. (1993) *Phys. Rev. B* 47:162; and Zajac et al., Pelikan et al., and Bulusheva et al., all supra).

$(CF_x)_n$ compounds are generally non-stoichiometric with x varying between 0 and 1.3. For x<0.04, fluorine is mainly present on the surface of the carbon particles (Nakajima et al. (1999) *Electrochemica Acta* 44:2879). For $0.5 \leq x \leq 51$, it has been suggested that the material consists of a mixture of two phases, $(CF_{0.5})_n$ and $(CF_1)_n$. "Overstoichiometric compounds," wherein $1 \leq x \leq \sim 1.3$, consist of $(CF_1)_n$ with additional perfluorinated —$CF_2$ surface groups (Mitkin et al., supra). Surprisingly, although they have been reported in the literature (Kuriakos et al, supra; Nakajima et al. (1999) *Electrochemica Acta* 44:2879; and Wood et al. (1973) *Abs. Am. Chem. Soc.* 121), covalent type $(CF_x)_n$ materials with x<0.5 have not been investigated in view of their crystal structure characterization. One possible reason of the focus on the fluorine-rich materials comes from their potential application as lubricants and as cathode materials for primary lithium batteries. In fact, for the latter application, the energy density of the battery, which is determined by its discharge time at a specific rate and voltage, has been found to be an increasing function of x.

The cell overall discharge reaction, first postulated by Wittingham (1975) *Electrochem. Soc.* 122:526, can be schematized by equation (1):

$$(CF_x)_n + xnLi \leftrightarrow nC + nxLiF \qquad (1)$$

Thus, the theoretical specific discharge capacity $Q_{th}$, expressed in mAh·g$^{-1}$, is given by equation (2):

$$Q_{th}(x) = \frac{xF}{3.6(12 + 19x)} \qquad (2)$$

where F is the Faraday constant and 3.6 is a unit conversion constant.

The theoretical capacity of $(CF_x)_n$ materials with different stoichiometry is therefore as follows: x=0.25, $Q_{th}$=400 mAh·g$^{-1}$; x=0.33, $Q^{th}$=484 mAh·g$^{-1}$; x=0.50, $Q_{th}$=623 mAh·g$^{-1}$; x=0.66, $Q_{th}$=721 mAh·g$^{-1}$; and x=1.00, $Q_{th}$=865 mAh·g$^{-1}$. It is interesting to note that even a low fluorine-containing $(CF_{0.25})_n$ material yields a higher theoretical specific capacity than $MnO_2$, i.e., 400 mAh·g$^{-1}$ versus 308 mAh·g$^{-1}$, respectively. Despite the higher capacity, longer shelf life (on the order of 15 years), and substantial thermal stability of $(CF_{0.25})_n$, $MnO_2$ is the most widely used solid state cathode in primary lithium batteries, in part because of lower cost, and in part because of a higher rate capability.

The lower rate performance of Li/(CF) batteries is presumably due to the poor electrical conductivity of the $(CF)_n$ material. In fact, the fluorination of graphite at high temperature (typically 350° C.$\leq$T$\leq$650° C.) induces a dramatic change in the stereochemical arrangement of carbon atoms. The planar sp$^2$ hybridization in the parent graphite transforms into a three-dimensional sp$^3$ hybridization in $(CF_x)_n$. In the latter, the carbon hexagons are "puckered," mostly in the chair conformation (Rudorff et al., Touhara et al., Watanabe et al., Kita et al., Charlier et al., Charlier et al., Zajac et al., Ebert et al., Bulusheva et al., and Lagow et al., all cited supra). Electron localization in the C—F bond leads to a huge drop of the electrical conductivity from ~1.7 10$^4$ S·cm$^{-1}$ in graphite to ~10$^{-14}$ S·cm$^{-1}$ in $(CF)_n$ (Touhara et al., supra).

Accordingly, there is a need in the art for electrode materials that would compensate for the low conductivity of fluorinated carbon materials while preserving their high thermal stability and high discharge capacity. Ideally, such electrodes would enable, for example, the manufacture of lithium batteries having increased battery performance when discharged, particularly at high rates.

SUMMARY OF THE INVENTION

The invention is directed to the aforementioned need in the art, and is premised on the discovery that electrodes fabricated with "subfluorinated" carbon materials, e.g., graphite fluorides $CF_x$ where x is in the range of 0.06 to 0.63, provide increased battery performance upon discharge at a high rate.

In one aspect of the invention, then, an electrochemical device is provided that comprises an anode, a cathode, and an ion-transporting material therebetween, wherein the cathode comprises a subfluorinated graphite fluoride of formula $CF_x$ in which x is in the range of 0.06 to 0.63. The anode includes a source of ions corresponding to a metal element of Groups 1, 2, or 3 of the Periodic Table of the Elements, e.g., lithium.

In another aspect of the invention, the aforementioned electrochemical device is a primary lithium battery in which the anode comprises a source of lithium ions, the cathode comprises a subfluorinated graphite fluoride having an average particle size in the range of about 4 microns to about 7.5 microns, and the ion-transporting material is a separator saturated with a nonaqueous electrolyte and physically separates the anode and cathode and prevents direct electrical contact therebetween.

In a further aspect of the invention, an electrode is provided for use in an electrochemical device that converts chemical energy to electrode current, the electrode comprising a subfluorinated graphite fluoride having an average particle size in the range of about 4 microns to about 7.5 microns. Generally, the subfluorinated graphite fluoride is present in a composition that additionally includes a conductive diluent and a binder.

In still a further aspect of the invention, a method is provided for preparing an electrode for use in an electrochemical device, comprising the following steps:

contacting graphite powder having an average particle size in the range of 1 micron to about 10 microns with a gaseous source of elemental fluorine at a temperature in the range of about 375° C. to about 400° C. for a time period of about 5 to about 80 hours, producing a subfluorinated graphite fluoride having the formula $CF_x$ in which x is in the range of 0.06 to 0.63;

admixing the subfluorinated graphite fluoride with a conductive diluent and a binder to form a slurry; and applying the slurry to a conductive substrate.

In still a further aspect of the invention, a rechargeable battery is provided that includes:

a first electrode comprising a subfluorinated graphite fluoride of formula $CF_x$ in which x is in the range of 0.06 to 0.63, the electrode capable of receiving and releasing cations of a metal selected from Groups 1, 2, and 3 of the Periodic Table of the Elements;

a second electrode comprising a source of the metal cations; and a solid polymer electrolyte that permits transport of the metal cations and physically separates the first and second electrodes.

DETAILED DESCRIPTION OF THE INVENTION

Figure 1:
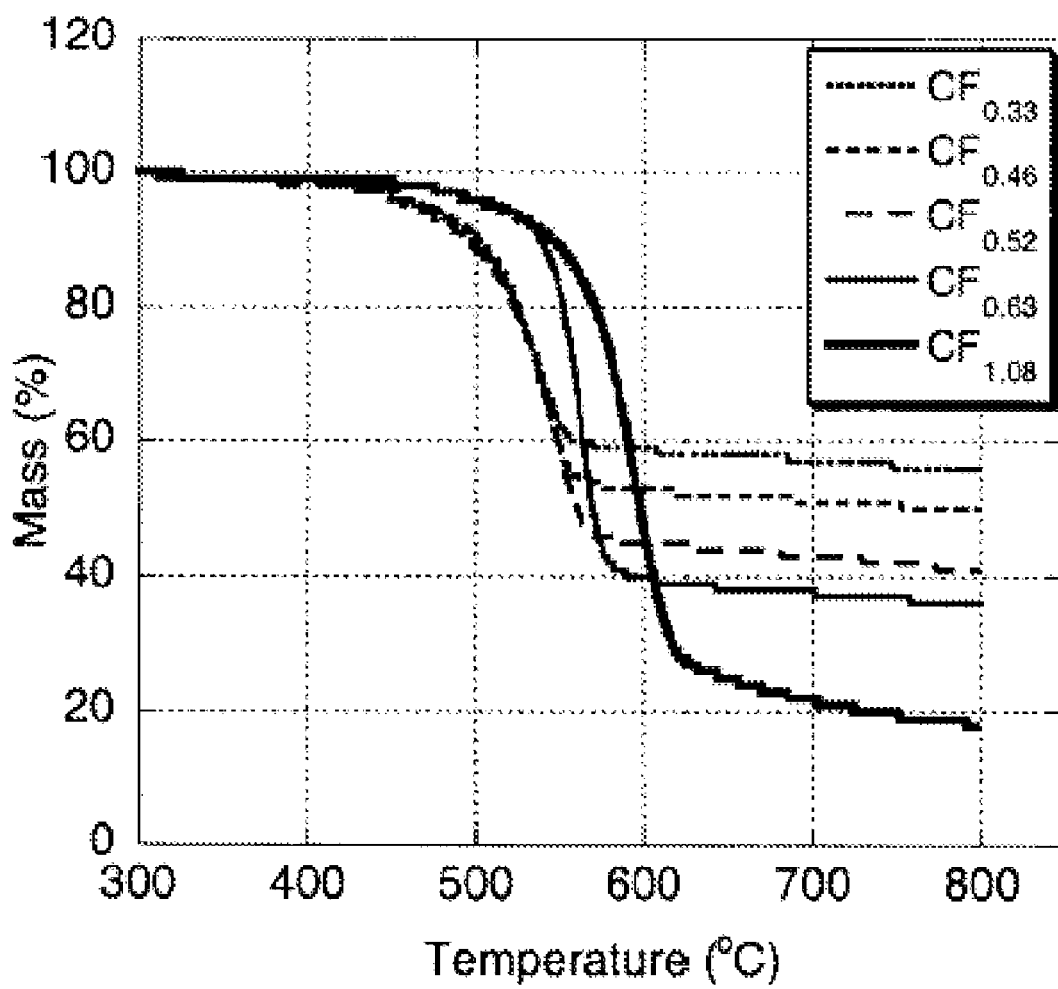
FIG. 1 depicts the thermogravimetric analysis (TGA) curves of graphite fluorides using a rate of 5° C./minute as evaluated in Example 2.

In one embodiment, the invention provides an electrochemical device that converts chemical energy to electrochemical current, such a device being exemplified by a lithium battery. The device has a cathode, i.e., a positive electrode, comprising a subfluorinated graphite fluoride; an anode, i.e., a negative electrode, comprising a source of an ion corresponding to a metal of Groups 1, 2, or 3 of the Periodic Table of the Elements; and an ion-transporting material that physically separates the two electrodes and prevents direct electrical contact therebetween.

The subfluorinated graphite fluoride is a carbon-fluorine intercalation compound having an overall formula $CF_x$ wherein x is in the range of 0.06 to 0.63, preferably in the range of 0.06 to 0.52, more preferably in the range of 0.10 to 0.52, still more preferably in the range of 0.10 to 0.46, and optimally in the range of 0.33 to 0.46. The subfluorinated graphite fluoride used in connection with the present invention is generally a particulate material, e.g., a powder, wherein the average particle size is typically 1 micron to about 10 microns, preferably about 4 microns to about 7.5 microns, and optimally about 4 microns.

In the electrochemical devices of the invention, the subfluorinated graphite fluoride is normally present in a composition that also includes a conductive diluent such as may be selected from, for example, acetylene black, carbon black, powdered graphite, cokes, carbon fibers, and metallic powders such as powdered nickel, aluminum, titanium, and stainless steel. The conductive diluent improves conductivity of the composition and is typically present in an amount representing about 1 wt. % to about 10 wt. % of the composition, preferably about 1 wt. % to about 5 wt. % of the composition. The composition containing the subfluorinated graphite fluoride and the conductive diluent also, typically, contains a polymeric binder, with preferred polymeric binders being at least partially fluorinated. Exemplary binders thus include, without limitation, poly(ethylene oxide) (PEO), poly(vinylidene fluoride) (PVDF), a poly(acrylonitrile) (PAN), poly (tetrafluoroethylene) (PTFE), and poly(ethylene-co-tetrafluoroethylene) (PETFE). The binders, if present, represent about 1 wt. % to about 5 wt. % of the composition, while the subfluorinated graphite fluorides represent about 85 wt. % to about 98 wt. % of the composition, preferably about 90 wt. % to 98 wt. % of the composition.

The subfluorinated graphite fluorides are prepared by fluorination of a graphite material or a graphitizable material (see U.S. Pat. No. 6,358,649 to Yazami et al.), with powdered graphite having an average particle size in the range of 1 micron to about 10 microns being preferred. A particle size of about 4 microns to about 7.5 microns is more preferred, with an approximately 4 micron particle size being optimal.

An electrode provided with the aforementioned conductive composition can be manufactured as follows:

Initially, the subfluorinated graphite fluoride is prepared using a direct fluorination method, in which graphite powder preferably having an average particle size in the range of 1 micron to about 10 microns is contacted with a gaseous source of elemental fluorine at a temperature in the range of about 375° C. to about 400° C. for a time period of about 5 to about 80 hours, preferably about 15 to 35 hours. A subfluorinated graphite fluoride as described above results. A suitable gaseous source of elemental fluorine will be known to one of ordinary skill in the art; an exemplary such source is a mixture of HF and $F_2$ in a molar ratio somewhat greater than 1:1, e.g., 1.1:1 to 1.5:1.

The resulting subfluorinated graphite fluoride is then admixed with a conductive diluent and binder as described above, with the preferred weight ratios being about 85 wt % to about 98 wt. %, more preferably about 90 wt. % to about 98 wt. %, subfluorinated graphite fluoride; about 1 wt. % to about 10 wt. %, preferably about 1 wt. % to about 5 wt. %, conductive diluent; and about 1 wt. % to about 5 wt. % binder.

Typically, the slurry formed upon admixture of the foregoing components is then deposited or otherwise provided an a conductive substrate to form the electrode. A particularly preferred conductive substrate is aluminum, although a number of other conductive substrates can also be used, e.g., stainless steel, titanium, platinum, gold, and the like.

In a primary lithium battery, for example, the aforementioned electrode serves as the cathode, with the anode providing a source of lithium ions, wherein the ion-transporting material is typically a microporous or nonwoven material saturated with a nonaqueous electrolyte. The anode may comprise, for example, a foil or film of lithium or of a metallic alloy of lithium (LiAl, for example), or of carbon-lithium, with a foil of lithium metal preferred. The ion-transporting material comprises a conventional "separator" material having low electrical resistance and exhibiting high strength, good chemical and physical stability, and overall uniform properties. Preferred separators herein, as noted above, are microporous and nonwoven materials, e.g., nonwoven polyolefins such as nonwoven polyethylene and/or nonwoven polypropylene, and microporous polyolefin films such as microporous polyethylene. An exemplary microporous polyethylene material is that obtained under the name Celgard® (e.g., Celgard® 2400, 2500, and 2502) from Hoechst Celanese. The electrolyte is necessarily nonaqueous, as lithium is reactive in aqueous media. Suitable nonaqueous electrolytes are composed of lithium salts dissolved in an aprotic organic solvent such as propylene carbonate (PC), ethylene carbonate (EC), ethyl methyl carbonate (EMC), dimethyl ether (DME), and mixtures thereof. Mixtures of PC and DME are common, typically in a weight ratio of about 1:3 to about 2:1. Suitable lithium salts for this purpose include, without limitation, $LiBF_4$, $LiPF_6$, $LiCF_3SO_3$, $LiClO_4$, $LiAlCl_4$, and the like. It will be appreciated that, in use, an applied voltage causes generation of lithium ions at the anode and migration of the ions through the electrolyte-soaked separator to the subfluorinated graphite fluoride cathode, "discharging" the battery.

In another embodiment, the subfluorinated graphite fluoride composition is utilized in a secondary battery, i.e., a rechargeable battery such as a rechargeable lithium battery. In such a case, the cations, e.g., lithium ions, are transported through a solid polymer electrolyte—which also serves as a physical separator—to the subfluorinated graphite fluoride electrode, where they are intercalated and de-intercalated by the subfluorinated graphite fluoride material. Examples of solid polymer electrolytes include chemically inert polyethers, e.g., poly(ethylene oxide) (PEO), poly(propylene oxide) (PPO), and other polyethers, wherein the polymeric material is impregnated or otherwise associated with a salt, e.g., a lithium salt such as those set forth in the preceding paragraph.

It is to be understood that while the invention has been described in conjunction with the preferred specific embodiments thereof, the foregoing description as well as the examples that follow are intended to illustrate and not limit the scope of the invention. Other aspects, advantages, and modifications within the scope of the invention will be apparent to those skilled in the art to which the invention pertains.

In the following examples, efforts have been made to ensure accuracy with respect to numbers used (e.g., amounts, temperature, etc.) but some experimental error and deviation should be accounted for. Unless indicated otherwise, temperature is in degrees C. and pressure is at or near atmospheric. All solvents were purchased as HPLC grade, and all reagents were obtained commercially unless otherwise indicated.

EXAMPLE 1

Synthesis of $(CF_x)_n$ Materials

Four samples of $(CF_x)_n$ (A, B, C, D) were synthesized by direct fluorination of a natural graphite powder from Madagascar obtained from Centre National de la Recherche Scientifique (CNRS, France) and Clermont-Ferrand University Lab (France). The average particle size for the precursor was 7.5 µm for samples A, B, and D whereas an average particle size of 4 µm was used for sample C. The fluorination temperature ranged from 375° C. to 400° C., and was adjusted to obtain the desired F/C ratios. A battery grade carbon monofluoride (E) derived from a petroleum coke was obtained from Advance Research Chemicals Inc. (ARC, Tulsa, Okla., USA). Table 1 summarizes the synthesis conditions used for each sample:

TABLE 1

Synthesis conditions for the $(CF_x)_n$ samples

| Sample | A | B | C | D | E |
|---|---|---|---|---|---|
| Precursor | NG | NG | NG | NG | Coke |
| Particle Size | ~7.5 µm | ~7.5 µm | ~4 µm | ~7.5 µm | ~15-30 µm |
| Temperature | 375° C. | 380° C. | 390° C. | 400° C. | N/A |
| Duration | 17 hrs | 32 hrs | 20 hrs | 80 hrs | N/A |

NG = natural graphite

EXAMPLE 2

Physical Characterization of $(CF_x)_n$ Materials

Methods:

Scanning electron microscopy (SEM, JEOL instrument) was performed to observe the particles' morphology and analyze their composition via electron-dispersive x-ray (EDX) spectrometry. Micrographs were taken at various magnifications ranging from 500× to 10,000×.

The chemical composition of each sample was determined using several methods. For samples A-D, the weight uptake during the fluorination reaction was used to determine the F/C ratio. EDX spectrometry provided semi-quantitative analyses of carbon and fluorine for all samples. These measurements were acquired on the SEM JEOL instrument with a Li-drifted Si crystal detector, at a working distance of 10 mm, and analyzed using INCA software. Additional elemental analysis was performed for sample E by a carbonate fusion method at ARC.

The thermal stability of the material was investigated by thermogravimetric analysis (TGA) performed on a Perkin Elmer Pyris Diamond instrument. The weight loss of the material under argon atmosphere was recorded while it was being heated at a rate of 5° C.·min$^{-1}$ between 25° C. and 900° C.

X-ray diffractometry (XRD) measurements were performed on a Rigaku instrument with CuK$_\alpha$ radiation. Silicon powder (~5 wt. %) was mixed in all samples and used as an internal reference. The spectra obtained were fitted on Xpert Highscore software. The resulting profiles were used in combination with CefRef software to determine the 'a' and 'c' crystal parameters of the hexagonal cell (P$_{-6m2}$) as proposed by Touhara et al. (1987) *Z. Anorg. All. Chem.* 544:7.

Results:

The scanning electron micrographs showed particle sizes ranging from about 2 to about 10 μm while the observed particle size of the commercially available $(CF_1)_n$ ranges from 10 to 35 μm. In addition to the particle size, the morphology of the two groups of samples seemed to differ. The sub-fluorinated $(CF_x)_n$ samples consisted of very thin flakes while the carbon monofluoride samples were bulkier. This difference presumably derives from the use of a natural graphite precursor for samples A, B, C, and D, and a larger petroleum coke precursor for sample E.

The weight uptake during the fluorination of the graphite materials was converted to an F/C ratio, with the measurements averaged over a minimum of five different areas of the sample. Table 2 summarizes the composition results obtained for each sample and method. The composition of samples A, B, C, and D as determined by weight uptake and EDX measurement correlated quite closely, as illustrated by the results set forth in the table. The composition of sample E as determined by a carbonate fusion method was identical to that determined by EDX measurements.

TABLE 2

Chemical composition determined by weight gain (A-D), EDX (A-E), and carbonate fusion method (E)

| Sample | | A | B | C | D | E |
|---|---|---|---|---|---|---|
| F/C Ratio | Weight Gain | 0.33 | 0.46 | 0.52 | 0.63 | N/A |
| | EDX | 0.36 | 0.47 | 0.60 | 0.67 | 1.08 |
| | ARC | | | | | 1.08 |

Given the results summarized in Table 2, samples A, B, C, D, and E will also be identified hereinafter as $CF_{0.33}$, $CF_{0.46}$, $CF_{0.52}$, $CF_{0.63}$, and $CF_{1.08}$, respectively.

The TGA traces of all samples are shown in FIG. 1. Below a temperature of 400° C., materials A-D were found to be very stable, with less than 1% observed loss of mass. Between 400° C. and 600° C., materials A-D underwent a noticeable decrease in mass. While the profile was similar for A, B, and C, material D exhibited a sudden drop in the temperature range of 525° C. to 580° C. Above 600° C., no significant loss of mass was observed until about 900° C., with the weight decreasing gradually, at a rate of less than 2% per degree. Material E has the same thermogram profile as material D, but exhibits somewhat higher thermal stability, beginning to decompose at about 450° C. and stopping at around 630° C. Table 3 summarizes the TGA results, highlighting a higher initial weight loss for $CF_{0.52}$. While not wishing to be bound by theory, it is presumed that this is due to the smaller particle size, and thus larger surface area, of the precursor. More surface adsorption effects cause greater initial weight loss at lower temperatures.

TABLE 3

Summary of the TGA results on the $(CF_x)_n$ powders

| Sample | | $CF_{0.33}$ | $CF_{0.46}$ | $CF_{0.52}$ | $CF_{0.63}$ | $CF_{1.08}$ |
|---|---|---|---|---|---|---|
| Temperature After | 1% wt. Loss | 380 | 374 | 328 | 393 | 426 |
| | 2% wt. Loss | 423 | 427 | 403 | 459 | 467 |
| | 3% wt. Loss | 443 | 448 | 433 | 485 | 485 |
| wt. % Remaining at 800° C. | | 55.6 | 49.7 | 40.9 | 35.7 | 18.4 |

Figure 2:
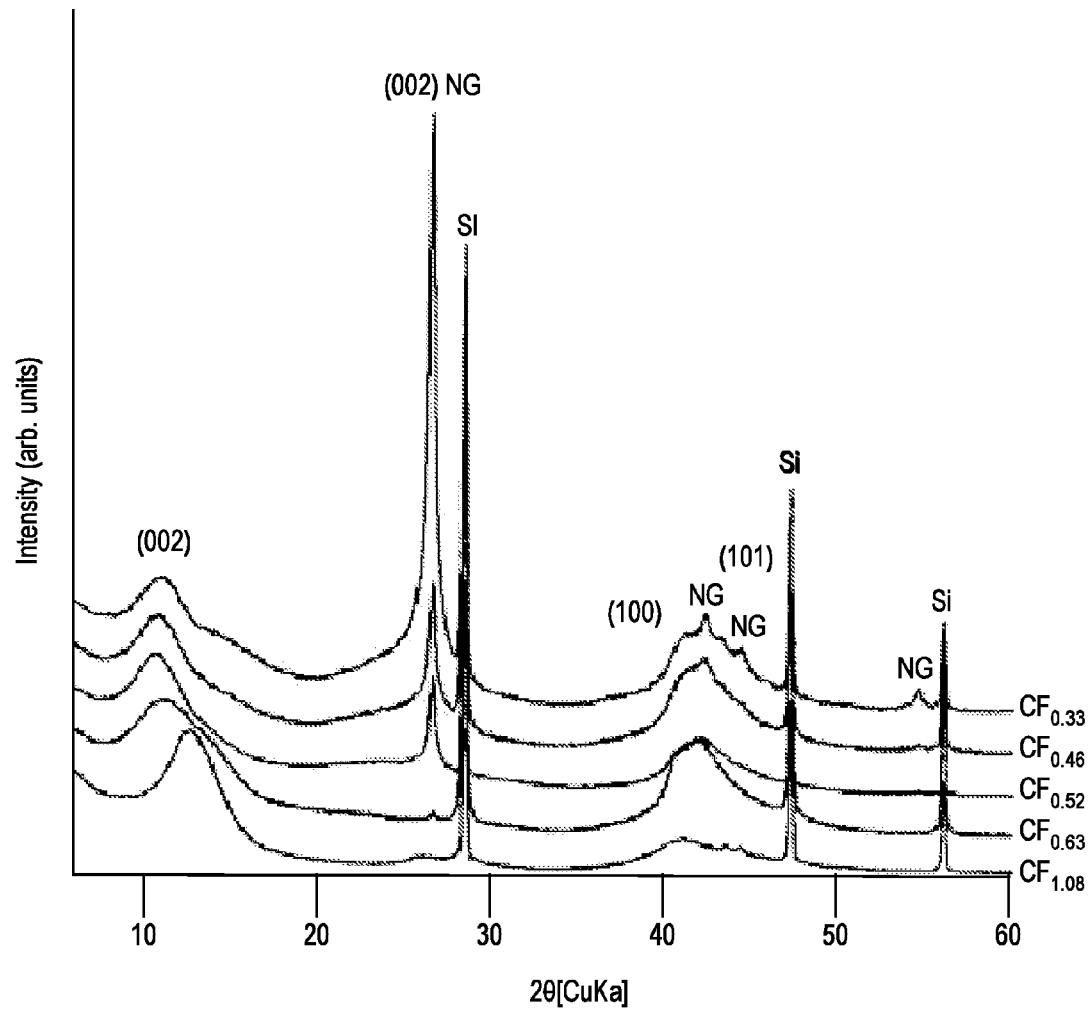
FIG. 2 provides the x-ray diffractometry measurements (XRD) on the graphite fluorides as determined in Example 2.

The XRD patterns, in FIG. 2, show a combination of broad and sharp peaks, with intensity variations reflecting the difference in the degree of fluorination. The sharper peaks originate from the un-fluorinated precursor (graphite for $CF_{0.33}$, $CF_{0.46}$, $CF_{0.52}$, $CF_{0.63}$, and coke for $CF_{1.08}$) and are most evident in samples $CF_{0.33}$, $CF_{0.46}$, $CF_{0.52}$. The strongest graphite peak (002) is observed at 26.5° with relative intensity decreasing with x. The broad peaks corresponding to the fluorinated phase are found at about 10°, 25°, and 40-45° for samples $CF_{0.33}$ to $CF_{0.63}$, and at about 13°, 26° and 41° for sample $CF_{1.08}$. Table 4 shows the 'a' and 'c' parameters obtained for the fluorinated phases assuming a hexagonal lattice structure.

TABLE 4

Summary of a and c parameters of the hexagonal unit cell derived from XRD measurements

| Sample | $CF_{0.33}$ | $CF_{0.46}$ | $CF_{0.52}$ | $CF_{0.63}$ | $CF_{1.08}$ |
|---|---|---|---|---|---|
| a(Å) | 2.54 | 2.54 | 2.54 | 2.54 | 2.54 |
| c(Å) | 16.65 | 16.55 | 16.20 | 16.65 | 12.70 |

Figure 3:
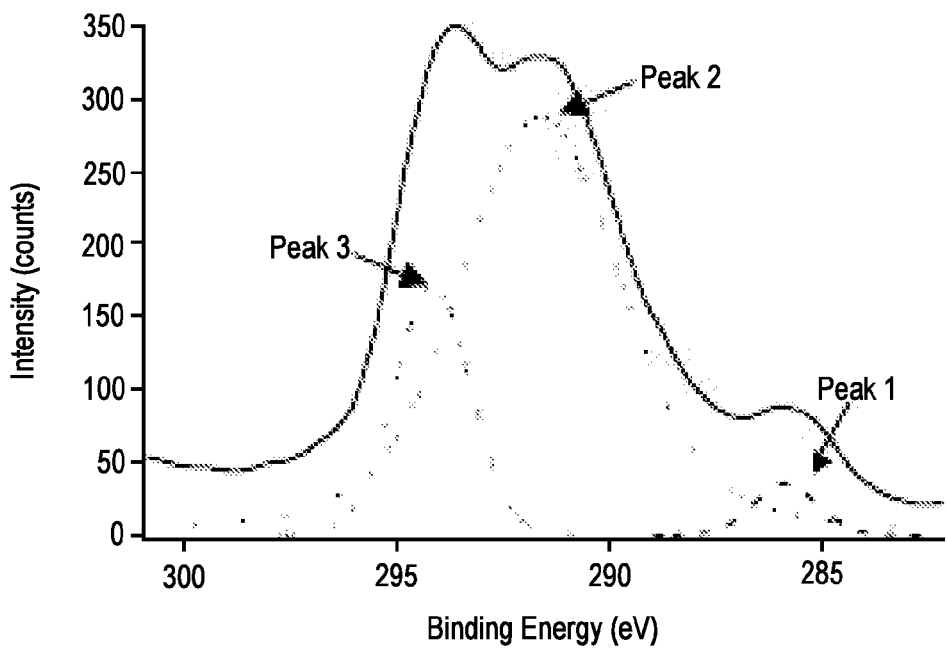
FIG. 3 provides the results of X-ray photoelectron spectroscopy (XPS) analysis of the graphite fluorides prepared as described in Example 1 and characterized in Example 2, with the $C_{1s}$ peaks in the primary spectrum having been deconvoluted.
Figure 4:
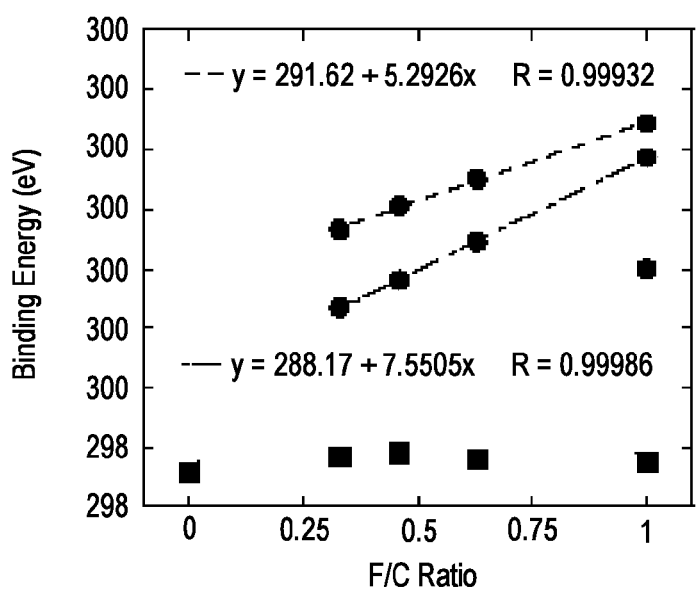
FIG. 4 is a graph showing a linear relationship between the degree of fluorination and the $C_{1s}$ binding energies of the graphite fluorides prepared as described in Example 1 and characterized in Example 2.

The $C_{1s}$ and $F_1$ binding energy spectra were collected and analyzed using X-ray photoelectron spectroscopy (XPS). Deconvolution of the $C_1$ peaks (FIG. 3) revealed two peaks other than the graphitic peak corresponding to x<1, and three peaks in addition to the peak found at 285.5 eV (corresponding to x=1). These peaks correspond to the sp$^3$-carbon from the C—F bonds, and the $CF_2$ or $CF_3$ bordering the graphene layers. Deconvolution of the $F_{1s}$ peaks resulted in two peaks matching the $C_{1s}$ peaks. FIG. 4 shows a linear relationship between the degree of fluorination and the $C_{1s}$ binding energies.

EXAMPLE 3

Electrochemical Performance of $(CF_x)_n$ Materials

Conventional 2032 coin cells were assembled to test the electrochemical performance of the $(CF_x)_s$ materials. The cathode was prepared by spreading a slurry of 5 g $(CF_x)_n$, 0.62 g carbon black, and 0.56 g polytetrafluoroethylene (PTFE)-based binder on an aluminum substrate. The anode was a lithium metal disc, and the separator consisted of a microporous polypropylene Celgard® 2500 membrane. The thicknesses of the cathode, anode, and separator were 15 mm, 16 mm, and 17.5 mm respectively. The electrolyte used was 1.2M LiBF$_4$ in a 3:7 v/v mixture of propylene carbonate (PC) and dimethyl ether (DME). Stainless steel spacers and a wave washer were used to maintain sufficient pressure inside the coin cell. The coin cells were discharged on an Arbin instrument by applying a constant current with a voltage cutoff of 1.5 V. The discharge rates ranged from 0.01 C to 2.5 C, at room temperature. The C-rate calculation was based on a theoretical capacity $Q_{th}$ in mAh/g determined by equation (2). A minimum of three cells were used for each test condition.

$$Q_{th}(x) = \frac{xF}{3.6(12+19x)} \quad (2)$$

Figure 5:
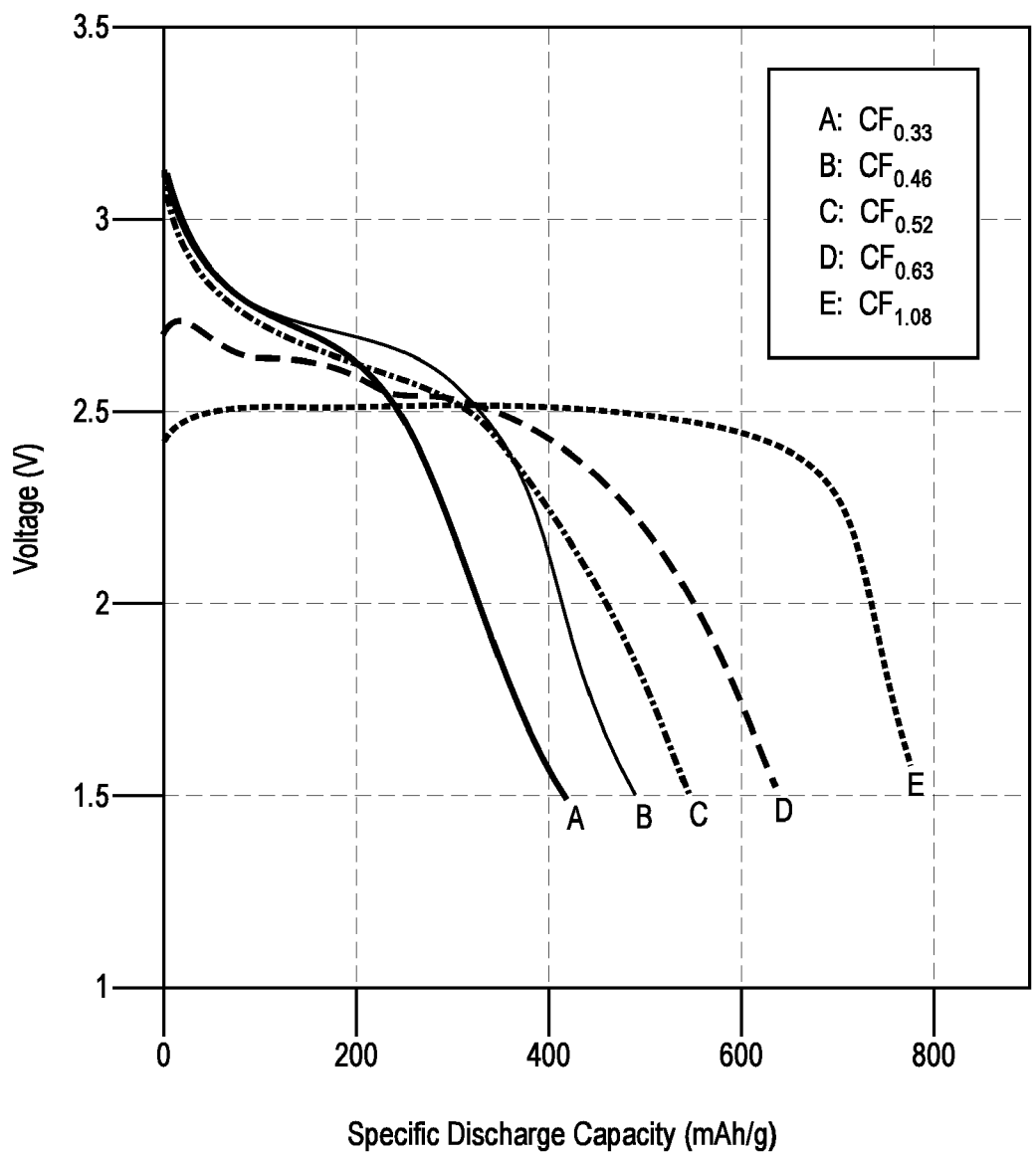
FIG. 5 illustrates the discharge profile of the Li/graphite fluoride cells prepared and evaluated as described in Example 3.

The discharge profile of the Li/(CF$_x$)$_n$ cells is shown in FIG. 5. While the battery grade carbon monofluoride exhibited the characteristic plateau around 2.5 V, the discharge profiles of samples CF$_{0.33}$, CF$_{0.46}$, CF$_{0.52}$ differed greatly in their voltage and shape. The discharge started at a higher voltage of about 3 V, dropped to about 2.8 V, then slowly decreased to about 2.5 V before a sharper drop to 1.5 V. The discharge curve of sample CF$_{0.63}$ falls in between the two previous groups. In the latter sample the initial voltage is found at around 2.7 V; the slope of the curve is flatter than that of CF$_{0.33}$, CF$_{0.46}$, CF$_{0.52}$, but steeper than CF$_{1.08}$. The discharge capacity differed depending on the discharge rate as well as the F/C ratio. The variations in potential are presumably due to the difference in the electrical conductivity of the materials. The existence of an unfluorinated graphitic phase may result in a higher conductivity between the fluorinated grains of graphite fluoride, which reduce cathodic overpotential. As a result, the lower the F/C the higher the discharge voltage plateau.

Figure 6:
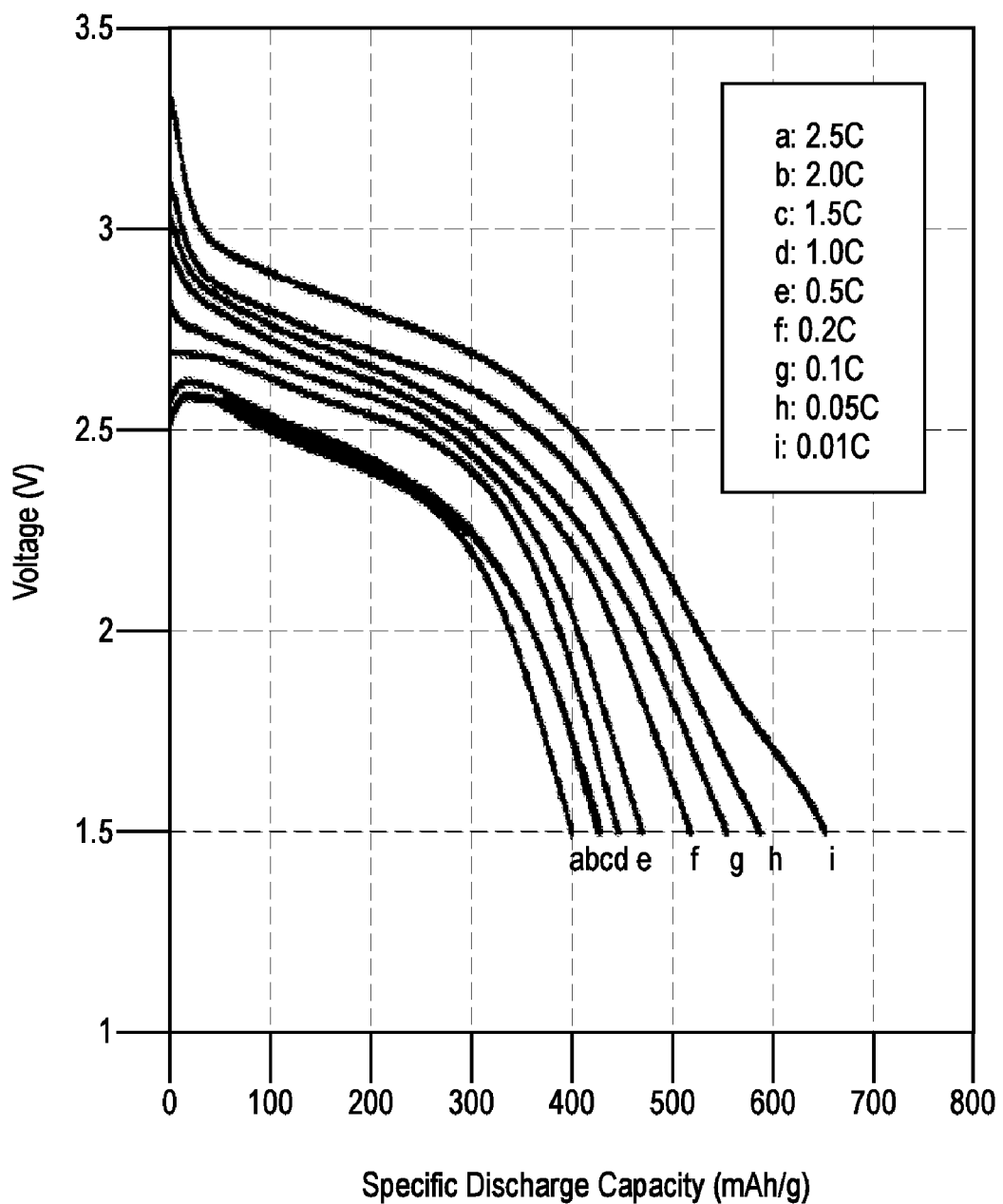
FIG. 6 illustrates the effect of discharge rate on the discharge profile for sample $CF_{0.52}$, as described in Example 3.

For each material, the increase in the discharge current caused a decrease in the average discharge voltage and a reduced capacity. FIG. 6 illustrates the effect of the discharge rates on the discharge profile for sample CF$_{0.52}$. At the lowest discharge rates (C/100 to C/5), the voltage drops gradually from an open-circuit voltage of about 3.4 V to 3 V. The initial voltage drop commonly observed in the fast discharges of Li/(CF$_x$)$_n$ batteries was observed only for rates of 1 C or higher. The discharge curves corresponding to 1.5 C, 2 C, and 2.5 C are very similar in voltage and capacity, and exhibit a significant voltage drop at the beginning of discharge. Similar effects were observed for the other materials. Such a drop in the potential for higher discharge rate is associated with a steep increase in the overpotential at the higher discharge currents. Again, for the sub-fluorinated samples, the conductivity of the materials should be higher than that of the battery grade carbon monofluoride, and, as a result, the cell overpotential at high discharge rates is lower.

Figure 7:
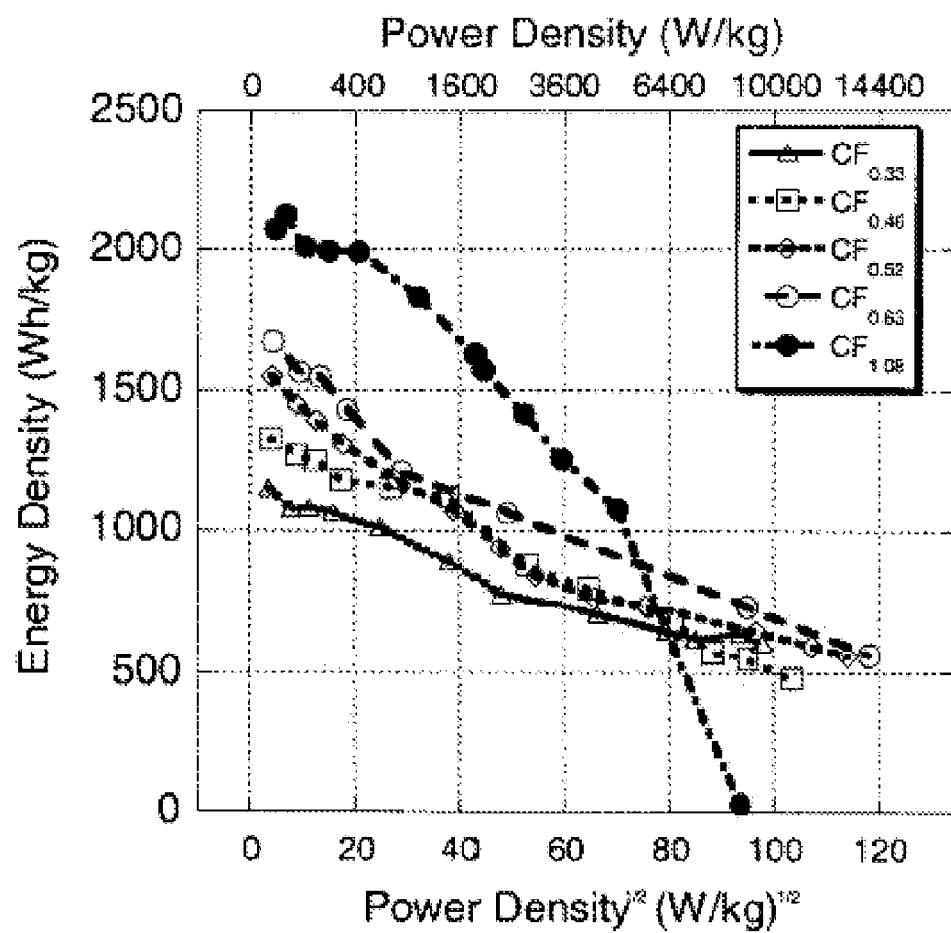
FIG. 7 is a Ragone plot indicating the performance of all graphite fluoride cells prepared as described in Example 3.

In order to compare the performance of the (CF$_x$)$_n$ materials under different discharge rates, a Ragone plot is presented in FIG. 7. It shows the achieved energy density E (Wh·kg$^{-1}$) versus the power density P (W·kg$^{-1}$) traces. E and P are determined from the discharge curves using equations (3) and (4):

$$E = \frac{q(i) \times \langle e_i \rangle}{m} \quad (3)$$

$$P = \frac{i \times \langle e_i \rangle}{m} \quad (4)$$

In the equations for E and P, q(i) and $\langle e_i \rangle$ respectively represent the discharge capacity (Ah) and the average discharge voltage (V) at current i (A), and m is the mass of active (CF$_x$)$_n$ in the electrode (kg). Note that the P scale in the Ragone plot is given as P$^{1/2}$ for clarity. As expected, carbon monofluoride exhibited a very high energy density (over 2000 Wh·kg$^{-1}$) for low rates of discharge (<C/10) while the sub-fluorinated graphites have significantly lower energy densities. Below 1000 W·kg$^{-1}$, the energy density was approximately proportional to the F/C ratio of the materials. Beyond that point, the operating voltage and discharge capacity of carbon monofluoride are drastically reduced causing a large decrease in the energy density. Similarly, the capacity of materials A-D is also reduced; however, the operating voltage is still greater than that of sample E, and the energy density is greater than 500 Wh·kg$^{-1}$ over 2.5C.

Accordingly, the results show that partially fluorinated graphite fluorides can outperform the traditional fluorinated petroleum coke as electrodes in electrochemical devices such as lithium batteries. Although lower fluorination content decreased specific discharge capacity of the material somewhat, that decrease was overshadowed by a very substantial increase in battery performance at high discharge rates.

EXAMPLE 4

Process for Making of (CF$_x$)$_n$ Materials

It is an objective of the present invention to provide methods of making subflourinated carbon materials exhibiting useful electronic and mechanical properties, particularly for use as electrode materials for batteries. Methods of the present invention are useful for making subfluorinated carbon materials having a carbon to fluoride stoichiometry selected for a particularly application, for example graphite fluorides, CF$_x$, where x is in the range of about 0.06 to about 0.63. The present invention provides efficient methods for making significant quantities of high quality graphite fluoride materials.

To demonstrate these capabilities of the present methods, we carried out a systematic study of the influence of a number of important process conditions on the yields and compositions of graphite fluoride materials synthesized. Specifically, in the synthesis conditions of CF$_x$ described herein, four main parameters are considered:

1. Amounts of graphite in the reactor (starting materials: Natural graphite from Madagascar of 7.5 μm average grains size, and synthetic graphite from Timcal, Co., Switzerland, average grains size 15-20 μm)
2. Reaction temperature
3. Time of Reaction
4. Fluorine gas flow rate In the methods of the present example, the graphite powder is uniformly spread on a nickel boat with a density of approximately 1 g/10 cm$^2$, then it is introduced into the reactor. The reactor is made of nickel, with a cylindrical shape and horizontal setting. Its internal volume is about 5.5 liters. The reactor is vacuum degassed for 2 hours, then fluorine gas is flown. The fluorine pressure is 1 atmosphere. The reaction proceeds under fluorine dynamic flow (open reactor). (Important note: if the reactor is closed (static reactor), the fluorination reaction becomes much slower.). The reactor is then heated at a rate of 1 degrees Celsius/minute. The reaction time is counted after the reactor reached the target temperature until the reactor heating is stopped. After the reactor cools down to the ambient temperature, excess (unreacted) fluorine was evacuated under nitrogen flow until no trace of free fluorine is in the reactor.

4.a. Effect of Temperature

Table 5 shows the yields and compositions of graphite fluoride materials synthesized for reaction temperatures ranging from 375 degrees Celsius to 490 degrees Celsius. In these experiments, the graphite mass is 13 grams, the fluorine gas flow rate is 1 g/hour and the reaction time is 14 hours.

TABLE 5

Yields and compositions of graphite fluoride materials synthesized for temperatures ranging from 375 degrees Celsius to 490 degrees Celsius

| Experiment n° | Temperature/ °C. | Masse of fluorinated graphite/g | Composition | Presence of graphite from XRD |
|---|---|---|---|---|
| 1 | 375 | 20.00 | $CF_{0.34}$ | Yes, a lot |
| 2 | 390 | 22.67 | $CF_{0.47}$ | Yes |
| 3 | 400 | 23.28 | $CF_{0.50}$ | Yes |
| 4 | 490 | 27.62 | $CF_{0.71}$ | No |

4.b. Effect of the Graphite Mass

Table 6 shows the yields and compositions of graphite fluoride materials synthesized for starting graphite masses ranging from 11 grams to 17 grams. In these experiments, the reaction temperature is 390 degrees Celsius, the fluorine gas flow rate is 1 g/hour and the reaction time is 17 hours.

TABLE 6

Yields and compositions of graphite fluoride materials synthesized for starting graphite masses ranging from 11 grams to 17 grams

| Experiment n° | Masse of graphite/g | Masse of fluorinated graphite/g | Composition | Presence of graphite from XRD |
|---|---|---|---|---|
| 5 | 11 | 21.0 | $CF_{0.57}$ | Yes |
| 6 | 15 | 27.65 | $CF_{0.53}$ | Yes |
| 7 | 17 | 31.06 | $CF_{0.52}$ | Yes |
| 8 | 20 | 35.56 | $CF_{0.49}$ | Yes |

4.c. Effect of the Fluorine Flow Rate

Table 7 shows the yields and compositions of graphite fluoride materials synthesized for fluorine gas flow rates ranging from 0.5 g/hour to 2 g/hour. In these experiments, the reaction temperature is 390 degrees Celsius, the starting graphite mass is 13 g and the reaction time is 17 hours.

TABLE 7

Yields and compositions of graphite fluoride materials synthesized for fluorine gas flow rates ranging from 0.5 g/hour to 2 g/hour

| Experiment n° | Fluorine flow rate g/hour | MASSE OF GRAPHITE/G | Composition | Presence of graphite from XRD |
|---|---|---|---|---|
| 9 | 0.5 | 20.15 | $CF_{0.35}$ | Yes, a lot |
| 10 | 0.7 | 23.00 | $CF_{0.48}$ | Yes, a lot |
| 11 | 0.8 | 24.57 | $CF_{0.56}$ | Yes |
| 12 | 1 | 26.05 | $CF_{0.63}$ | Yes, a few |
| 13 | 2 | 26.13 | $CF_{0.64}$ | No, traces |

4.d. Effect of the Reaction Time

Table 8 shows the yields and compositions of graphite fluoride materials synthesized for reaction times ranging from 10 hours to 40 hours. In these experiments, the reaction temperature is 390 degrees Celsius, the starting graphite mass is 13 g and the fluorine gas flow rate is 1 g/hour.

TABLE 8

Yields and compositions of graphite fluoride materials synthesized for reaction times ranging from 10 hours to 40 hours

| Experiment n° | Reaction time/ hour | Masse of fluorinated graphite/g | Composition | Presence of graphite from XRD |
|---|---|---|---|---|
| 14 | 10 | 20.50 | $CF_{0.36}$ | Yes, quite a lot |
| 15 | 14 | 22.67 | $CF_{0.47}$ | Yes, quite a lot |
| 16 | 16 | 23.10 | $CF_{0.49}$ | Yes, quite a lot |
| 17 | 18 | 24.95 | $CF_{0.58}$ | Yes |
| 18 | 20 | 26.15 | $CF_{0.64}$ | Very few |
| 19 | 24 | 27.00 | $CF_{0.68}$ | No |
| 20 | 40 | 27.72 | $CF_{0.71}$ | No |

4.e Synthesis of Larger Amounts

Table 9 shows the results of experiments wherein larger amounts (e.g., about 55 grams to about 65 grams) of graphite fluoride materials were synthesized. In these experiments, the reaction temperature is 390 degrees Celsius, the reaction time is 17 hours and the fluorine gas flow rate is 2 g/hour.

TABLE 9

The results of experiments wherein larger amounts (e.g., about 55 grams to about 65 grams) of graphite fluoride materials were synthesized.

| Experiment no. | Mass of graphite (synthetic)/g | Reaction Temperature/ °C. | MASSE OF FLUORINATED GRAPHITE/G | Composition | Presence of graphite from XRD |
|---|---|---|---|---|---|
| 21 | 30 | 375 | 54.77 | $CF_{0.52}$ | Yes, a lot |
| 22 | 30 | 390 | 60.10 | $CF_{0.63}$ | Yes |
| 23 | 30 | 490 | 65.38 | $CF_{0.74}$ | No |

We claim:

1. An electrochemical device comprising an anode, a cathode, and an ion-transporting material therebetween, wherein the cathode comprises a subfluorinated graphite fluoride of formula CFx in which x is in the range of 0.06 to 0.63.

2. The device of claim 1, wherein x is in the range of 0.06 to 0.52.

3. The device of claim 2, wherein x is in the range of 0.10 to 0.52.

4. The device of claim 3, wherein x is in the range of 0.10 to 0.46.

5. The device of claim 4, wherein x is in the range of 0.33 to 0.46.

6. The device of claim 1, wherein the subfluorinated graphite fluoride comprises a particulate material.

7. The device of claim 6, wherein the subfluorinated graphite fluoride has an average particle size in the range of about 1 micron to about 10 microns.

8. The device of claim 7, wherein the subfluorinated graphite fluoride has an average particle size in the range of about 4 microns to about 7.5 microns.

9. The device of claim 8, wherein the subfluorinated graphite fluoride has an average particle size of about 4 microns.

10. The device of claim 1, wherein the subfluorinated graphite fluoride is in a composition further comprising a conductive diluent and a binder.

11. The device of claim 10, wherein the conductive diluent is selected from acetylene black, carbon black, powdered graphite, cokes, carbon fibers, metallic powders, and combinations thereof.

12. The device of claim 11, wherein the conductive diluent is acetylene black.

13. The device of claim 10, wherein the binder is polymeric.

14. The device of claim 13, wherein the binder is a fluorinated hydrocarbon polymer.

15. The device of claim 1, wherein the anode comprises a source of ions of a metal selected from Groups 1, 2, and 3 of the Periodic Table of the Elements.

16. The device of claim 15, wherein the ions are lithium ions.

17. The device of claim 16, wherein the source of lithium ions is selected from lithium metal, a lithium alloy, and a carbon-lithium material.

18. The device of claim 17, wherein the source of lithium ions is lithium metal.

19. The device of claim 1, wherein the ion-transporting material physically separates the anode and the cathode and prevents direct electrical contact therebetween.

20. The device of claim 19, wherein the ion-transporting material comprises a polymeric material and a nonaqueous electrolyte.

21. The device of claim 1, wherein the device is a primary lithium battery and:
the anode comprises a source of lithium ions;
the cathode comprises a subfluorinated graphite fluoride of formula $CF_x$ in which x is in the range of 0.06 to 0.63, wherein the subfluorinated graphite fluoride comprises a particulate material having an average particle size in the range of about 4 microns to about 7.5 microns; and
the ion-transporting material physically separates the anode and the cathode and prevents direct electrical contact therebetween, wherein the ion-transporting material comprises a nonaqueous electrolyte.

22. The device of claim 21, wherein x is in the range of 0.10 to 0.52.

23. The device of claim 22, wherein x is in the range of 0.10 to 0.46.

24. The device of claim 23, wherein x is in the range of 0.33 to 0.46.

25. The electrochemical device of claim 1, wherein said subfluorinated graphite fluoride of said cathode is made by contacting a graphite powder having an average particle size in the range of 1 micron to 10 microns with a gaseous source of elemental fluorine at a temperature in the range of 375°C00 to 40000 for a time period of 5 to 80 hours.

26. The electrochemical device of claim 25, wherein said gaseous source of elemental fluorine is fluorine gas.

27. The electrochemical device of claim 25, wherein said gaseous source of elemental fluorine is a flow of fluorine gas provided as a flow to an open reactor containing said graphite powder.

28. The electrochemical device of claim 25, wherein said gaseous source of elemental fluorine is a flow of fluorine gas having a flow rate selected from the range of 0.5 g/hour to 1 g/hour.

29. The electrochemical device of claim 25, wherein said gaseous source of elemental fluorine is a mixture of HF and $F_2$ gases.

30. The electrochemical device of claim 29, wherein said mixture of HF and $F_2$ gases has a molar ratio greater than 1:1.

31. The electrochemical device of claim 25, wherein said graphite powder has an average particle size in the range of 4 microns to 7.5 microns.

32. The electrochemical device of claim 1, wherein said subfluorinated graphite fluoride of said cathode comprises fluorinated and unfluorinated graphitic phases.

33. An electrode for use in an electrochemical device that converts chemical energy to electrical current, the electrode comprising a subfluorinated graphite fluoride of formula $CF_x$ in which x is in the range of 0.10 to 0.52, wherein the subfluorinated graphite fluoride comprises a particulate material having an average particle size in the range of about 4 microns to about 7.5 microns.

34. The electrode of claim 33, wherein x is in the range of 0.10 to 0.46.

35. The electrode of claim 33, wherein x is in the range of 0.33 to 0.46.

36. The electrode of claim 33, wherein the subfluorinated graphite fluoride is in a composition further comprising a conductive diluent and a binder.

37. The electrode of claim 36, wherein the conductive diluent is selected from acetylene black, carbon black, powdered graphite, cokes, carbon fibers, metallic powders, and combinations thereof.

38. The electrode of claim 37, wherein the conductive diluent is acetylene black.

39. The electrode of claim 36, wherein the binder is polymeric.

40. The electrode of claim 39, wherein the binder is a fluorinated hydrocarbon polymer.

41. The electrode of claim 33, wherein said subfluorinated graphite fluoride is made by contacting a graphite powder having an average particle size in the range of 4 microns to 7.5 microns with a gaseous source of elemental fluorine at a temperature in the range of 375°C. to 400°C. for a time period of 5 to 80 hours.

42. The electrode of claim 41, wherein said gaseous source of elemental fluorine is fluorine gas.

43. The electrode of claim 41, wherein said gaseous source of elemental fluorine is a flow of fluorine gas provided as a flow to an open reactor containing said graphite powder.

44. The electrode of claim 41, wherein said gaseous source of elemental fluorine is a mixture of HF and $F_2$ gases.

45. The electrode of claim 44, wherein said mixture of HF and $F_2$ gases has a molar ratio greater than 1:1.

46. The electrode of claim 41, wherein said graphite powder has an average particle size of 4 microns.

47. The electrode of claim 33, wherein said subfluorinated graphite fluoride comprises fluorinated and unfluorinated graphitic phases.

48. A method for preparing an electrode for use in an electrochemical device, comprising:
contacting graphite powder having an average particle size in the range of 1 micron to about 10 microns with a gaseous source of elemental fluorine at a temperature in the range of about 375° C. to about 400° C. for a time period of about 5 to about 80 hours, whereby a subfluorinated graphite fluoride is provided having the formula $CF_x$ in which x is in the range of 0.06 to 0.63;
admixing the subfluorinated graphite fluoride with a conductive diluent and a binder to form a slurry; and
applying the slurry to a conductive substrate.

49. The method of claim 48, wherein the graphite powder has an average particle size in the range of 4 microns to about 7.5 microns.

50. The method of claim 48, wherein the time period is in the range of about 15 to about 35 hours.

51. A rechargeable battery comprising:
- a first electrode comprising a subfluorinated graphite fluoride of formula $CF_x$ in which x is in the range of 0.06 to 0.63, and capable of receiving and releasing cations of a metal selected from Groups 1, 2, and 3 of the Periodic Table of the Elements;
- a second electrode comprising a source of said metal cations; and
- a solid polymer electrolyte that permits transport of said metal cations and physically separates the first and second electrodes.

52. The rechargeable battery of claim 51, wherein the metal is lithium.

53. The rechargeable battery of claim 51, wherein said subfluorinated graphite fluoride of said first electrode is made by contacting a graphite powder having an average particle size in the range of 1 micron to 10 microns with a gaseous source of elemental fluorine at a temperature in the range of 375°C. to 400°C. for a time period of 5 to 80 hours.

54. The rechargeable battery of claim 53, wherein said gaseous source of elemental fluorine is fluorine gas.

55. The rechargeable battery of claim 53, wherein said gaseous source of elemental fluorine is a flow of fluorine gas provided as a flow to an open reactor containing said graphite powder.

56. The rechargeable battery of claim 53, wherein said gaseous source of elemental fluorine is a flow of fluorine gas having a flow rate selected from the range of 0.5 g/hour to 1 g/hour.

57. The rechargeable battery of claim 53, wherein said gaseous source of elemental fluorine is a mixture of HF and $F_2$ gases.

58. The rechargeable battery of claim 57, wherein said mixture of HF and $F_2$ gases has a molar ratio greater than 1:1.

59. The rechargeable battery of claim 53, wherein said graphite powder has an average particle size in the range of 4 microns to 7.5 microns.

60. The rechargeable battery of claim 51, wherein said subfluorinated graphite fluoride of said first electrode comprises fluorinated and unfluorinated graphitic phases.

* * * * *